US012674425B2

(12) United States Patent
Vaidya et al.

(10) Patent No.: US 12,674,425 B2
(45) Date of Patent: *Jul. 7, 2026

(54) GAS TURBINE ENGINES AND EPICYCLIC GEARBOXES WITH PLANET GEAR CLEARANCES

(71) Applicant: General Electric Company, Schenectady, NY (US)

(72) Inventors: Kedar S. Vaidya, Niskayuna, NY (US); Bugra H. Ertas, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,941

(22) Filed: Dec. 30, 2024

(65) Prior Publication Data

US 2025/0207534 A1     Jun. 26, 2025

Related U.S. Application Data

(63) Continuation-in-part of application No. 17/981,219, filed on Nov. 4, 2022, now Pat. No. 12,276,228.

(30) Foreign Application Priority Data

Jul. 27, 2022    (IN) .............................. 202211043036

(51) Int. Cl.
*F02C 7/36*          (2006.01)
*F01D 25/18*         (2006.01)
(Continued)

(52) U.S. Cl.
CPC ............... *F02C 7/36* (2013.01); *F01D 25/18* (2013.01); *F02C 7/06* (2013.01); *F02K 3/06* (2013.01);
(Continued)

(58) Field of Classification Search
None
See application file for complete search history.

(56) References Cited

U.S. PATENT DOCUMENTS 4,215,412  A      7/1980  Bernier et al.
7,945,397  B2     5/2011  Kar
(Continued)

FOREIGN PATENT DOCUMENTS

CN          105177492  A      12/2015
CN          105697730  A1     5/2016
(Continued)

OTHER PUBLICATIONS

Anderson et al., "Advanced Gearbox Technology Final Report," Allison Gas Turbine Division, General Motors Corporation, NASA CR-179625 (Aug 1984-Jan. 1987) (156 pages).
(Continued)

*Primary Examiner* — Juan G Flores
(74) *Attorney, Agent, or Firm* — Klarquist Sparkman, LLP

(57) ABSTRACT

A gas turbine engine includes a gearbox assembly for delivering torque from a low speed shaft to a primary fan. The gearbox assembly includes a planet gear and a bearing pin for the planet gear. The planet gear and bearing pin are arranged so that a clearance between the two is maintained during a takeoff condition for the gas turbine engine. The gas turbine engine further includes a lubricant system for supplying lubricant to the gearbox assembly.

20 Claims, 11 Drawing Sheets

(51) Int. Cl.
    *F02C 7/06*            (2006.01)
    *F02K 3/06*            (2006.01)
    *F16H 57/04*          (2010.01)

(52) U.S. Cl.
    CPC ..... *F16H 57/0417* (2013.01); *F16H 57/0435*
        (2013.01); *F16H 57/0479* (2013.01); *F05D*
        *2260/40311* (2013.01)

(56) References Cited

U.S. PATENT DOCUMENTS

| | | | |
|---|---|---|---|
| 8,298,108 | B2 | 10/2012 | Nishida et al. |
| 8,491,435 | B2 | 7/2013 | Ghanime et al. |
| 8,572,943 | B1 | 11/2013 | Sheridan |
| 10,228,024 | B2 * | 3/2019 | Hallman ............... F16C 33/581 |
| 10,267,365 | B2 | 4/2019 | Hasting |
| 10,487,917 | B2 | 11/2019 | Chmylkowski |
| 10,508,731 | B2 * | 12/2019 | Hallman ................... F16H 1/28 |
| 10,533,451 | B2 | 1/2020 | Klaus |
| 10,550,700 | B1 | 2/2020 | Howarth et al. |
| 10,626,490 | B2 | 4/2020 | Heeur et al. |
| 10,634,233 | B1 | 4/2020 | Smith |
| 10,641,182 | B1 | 5/2020 | Bemment |
| 10,746,188 | B2 | 8/2020 | MacFarlane et al. |
| 10,801,609 | B2 * | 10/2020 | Lemoine ................. B23P 19/04 |
| 10,823,084 | B1 * | 11/2020 | Spruce ...................... F02C 7/36 |
| 10,882,629 | B2 | 1/2021 | Hartshorn et al. |
| 10,954,999 | B2 | 3/2021 | El-Shafei |
| 12,276,228 | B2 * | 4/2025 | Vaidya .................. F16H 57/082 |
| 2011/0056183 | A1 | 3/2011 | Sankrithi et al. |
| 2011/0212808 | A1 | 9/2011 | Pabst |
| 2012/0288358 | A1 | 11/2012 | Balk |
| 2014/0140824 | A1 | 5/2014 | Sheridan |
| 2014/0161591 | A1 | 6/2014 | Venter |
| 2014/0205438 | A1 | 7/2014 | Hasel |
| 2014/0227084 | A1 | 8/2014 | Sheridan |
| 2014/0283500 | A1 | 9/2014 | Sabnis |
| 2015/0027101 | A1 | 1/2015 | Hasel |
| 2016/0010590 | A1 | 1/2016 | Rolt |
| 2016/0208651 | A1 | 7/2016 | Dolman et al. |
| 2016/0215729 | A1 | 7/2016 | Sabnis |
| 2017/0175675 | A1 | 6/2017 | Sabnis |
| 2018/0135557 | A1 | 5/2018 | Pouyau et al. |
| 2018/0195465 | A1 | 7/2018 | Bruhat |
| 2018/0252166 | A1 | 9/2018 | Pointon et al. |
| 2018/0259005 | A1 | 9/2018 | Nikola et al. |
| 2018/0291819 | A1 | 10/2018 | Sheridan |
| 2018/0363123 | A1 | 12/2018 | Lapierre et al. |
| 2019/0170240 | A1 | 6/2019 | Charrier et al. |
| 2019/0360578 | A1 | 11/2019 | Chevillot et al. |
| 2019/0383168 | A1 | 12/2019 | Valva et al. |
| 2020/0132186 | A1 | 4/2020 | Dombek et al. |
| 2020/0277901 | A1 | 9/2020 | Bemment |
| 2021/0010392 | A1 * | 1/2021 | Molesini ............. F16H 57/0479 |
| 2021/0108572 | A1 | 4/2021 | Khalid et al. |
| 2022/0042461 | A1 | 2/2022 | Molesini et al. |
| 2022/0042462 | A1 | 2/2022 | Molesini et al. |
| 2022/0042463 | A1 | 2/2022 | Molesini et al. |
| 2022/0042464 | A1 | 2/2022 | Molesini et al. |
| 2022/0056811 | A1 | 2/2022 | Molesini et al. |
| 2022/0235698 | A1 | 7/2022 | Stieger et al. |

FOREIGN PATENT DOCUMENTS

| | | |
|---|---|---|
| CN | 110791728 A | 2/2020 |
| EP | 2360391 A1 | 8/2011 |
| EP | 3372808 A2 | 9/2018 |
| EP | 3543476 | 9/2019 |
| EP | 3591191 | 1/2020 |
| EP | 3670871 | 6/2020 |
| FR | 2991694 B1 | 8/2015 |
| JP | 2006037979 A | 2/2006 |
| WO | WO 2014/066503 A1 | 5/2014 |
| WO | WO 2014/170566 A1 | 10/2014 |
| WO | WO 2019/016491 A1 | 1/2019 |

OTHER PUBLICATIONS

Hendricks et al., "Performance and Weight Estimates for an Advanced Open Rotor Engine," Prepared for the 48th Joint Propulsion Conf and Exhibit cosponsored by the AIAA, ASME, SAE, and ASEE, Atlanta, GA, NASA/TM-2012-217710, AIAA-2012-3911 (Sep. 2012) (20 pages).

Hart, K. Basic Architecture and Sizing of Commercial Aircraft Gas Turbine Oil Feed Systems. Proceedings of ASME Turbo Expo 2008. Jun. 9-13, 2008. (Year: 2008).

Machine Design. Spur versus planetary gearheads for de servomotors. Accessed from https://www.machinedesign.com/archive/article/21813332/spur-versus-planetary-gearheads-for-dc-servomotors (Year: 2000).

Max Power. Know Which Gear is More Efficient. accessed from http://maxpowergears.com/know-gear-efficient/ (Year: 2017).

* cited by examiner

| Epicyclic Gear Train 200 | Gear Ratio (GR) | Fan Horsepower (HP) | Fan Speed ($\Omega_{fan}$) (rpm) | Number of Planet Gears 204 ($N_p$) | Planet Gear Bending Stress Neutral Axis Radius 308 ($r_p$) (in.) | Clearance 318 (cr) (mils) | Pin Clearance Parameter (PCP) (rpm) |
|---|---|---|---|---|---|---|---|
| Epicyclic Gear Train #1 | 3 | 8000 | 2933 | 3 | 2 | 3.75 | 87 |
| Epicyclic Gear Train #2 | 3.5 | 30000 | 2629 | 5 | 2.84 | 1.19 | 576 |
| Epicyclic Gear Train #3 | 3.2 | 25000 | 2813 | 4 | 3 | 2.25 | 866 |
| Epicyclic Gear Train #4 | 3 | 29000 | 3333 | 5 | 2.5 | 1.25 | 1291 |

FIG. 5

| Parameter | Range(s) |
|---|---|
| Pin Clearance Parameter (PCP) | 0 rpm–3,334 rpm<br>0 rpm–3,000 rpm<br>48 rpm–3,000 rpm<br>48 rpm–1,334 rpm<br>80 rpm–1,300 rpm |
| Gear Ratio (GR) | 3–5 |
| Clearance 318 ($c_r$) | 0.00075" –0.012" |
| Planet Gear Bending Stress Neutral Axis Radius 308 ($r$)$_p$ | 1.5" –4.0" |
| Number of Planet Gears 204 ($N_p$) | 3–6 |
| Fan Horsepower ($HP_{fan}$) | 7,000 hp–80,000 hp |
| Fan Speed ($\Omega_{fan}$) | 1,600 rpm–3,334 rpm |
| First Constant ($K_1$) | $1.96 \times 10^{6} \frac{1}{hp.min.in}$ |
| Second Constant ($K_2$) | $4.91 \times 10^{-9} \frac{hp.min^3}{in^3}$ |

FIG. 6

GAS TURBINE ENGINES AND EPICYCLIC GEARBOXES WITH PLANET GEAR CLEARANCES

CROSS-REFERENCE TO RELATED APPLICATIONS

This application is a continuation-in-part of U.S. patent application Ser. No. 17/981,219, filed Nov. 4, 2022, which claims the benefit of Indian Patent Application number 202211043036, filed Jul. 27, 2022, each of which is incorporated by reference herein in its entirety.

FIELD

This application generally relates to gas turbine engines used in aircraft.

BACKGROUND

Gas turbine engines for aircraft typically include a fan, a low pressure compressor, and a low pressure turbine rotationally coupled in a series configuration by a low pressure shaft. In some instances, gas turbine engines can be geared engines including a gearbox disposed between and interconnecting the fan and the low pressure turbine. The gearbox allows the low pressure turbine to rotate at a different speed than the fan. Thus, the gearbox can, for example, allow the low pressure turbine and the fan to operate at their respective rotational speeds for maximum efficiency and/or power production.

Despite certain advantages, geared gas turbine engines can have one or more drawbacks. For example, including a gearbox in a gas turbine engine introduces additional complexity to the engine. This can, for example, make engine development and/or manufacturing significantly more difficult. As such, there is a need for improved geared gas turbine engines. There is also a need for devices and methods that can be used to develop and manufacture geared gas turbine engines more efficiently and/or precisely.

SUMMARY

Aspects and advantages of the disclosed technology will be set forth in part in the following description, or may be obvious from the description, or may be learned through practice of the technology disclosed in the description.

Various gas turbine engines are disclosed herein. The disclosed gear assemblies include gearboxes mechanically coupled to LP shafts of the gas turbine engines. The gearboxes include epicyclic gear trains with planet gears arranged in a planetary configuration.

Each planet gear includes a bearing pin defining a pin outer surface and an annular planet gear rim with an inner surface and a planet gear bending stress neutral axis radius. The planet gear bending stress neutral axis radius is a radius of the planet gear where stresses and strains within the annular planet gear rim are zero when a radial component force, a pinch component force, a tangential component force, and a centrifugal component force are applied to the planet gear. The inner surface of the planet gear rim and the pin outer surface define a clearance therebetween. In some examples, the bearing pins can include journal bearings, which can cost less and be more durable than roller bearings.

The disclosed gas turbine engines, and specifically the clearances between the planet gear rims and bearing pins of the disclosed gas turbine engines, are characterized by a pin clearance parameter. The pin clearance parameter (PCP), measured in rpm, equals $$\frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein $c_r$ is the clearance in inches, GR is a gear ratio of the gearbox, $r_p$ is the planet gear bending stress neutral axis radius in inches, $N_p$ is a number of the plurality of planet gears, $HP_{fan}$ is a fan power of the gas turbine engine in horsepower at takeoff conditions, $\Omega_{fan}$ is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch.

The pin clearance parameter may be used, for example, to aid the development of the gearbox. In particular embodiments, when the pin clearance parameter is greater than or equal to zero rpm and less than or equal to 3,334 rpm, enhanced performance of the gearbox can be achieved because the planet gear rim does not deform or bend such that the planet gear rim contacts the surface of the bearing pin when resultant radial component forces, pinch component forces, tangential component forces, and centrifugal component forces are exerted on the planet gear rim. Thus, the pin clearance parameter thus provides improved gas turbine engines and/or can help simplify one or more complexities of geared gas turbine engine development.

The disclosed gas turbine engines further include lubricant systems for lubricating the gearboxes, and in particular, the planet gears, bearing pins, and/or journal bearings disposed within the gearboxes. The disclosed lubricant systems can include scavange lines for recovering lubricant flowing through the gearboxes. In particular embodiments, the disclosed lubricant systems can include closed loop control systems with bypass valves for regulating the temperature of the lubricant flowing through the gearboxes. Optionally, the disclosed lubricant systems can include heat exchangers for recovering thermal energy from the lubricant flowing through the gearboxes.

The disclosed lubricant systems are particularly useful for gas turbine engines that include the disclosed epicyclic gearboxes. For example, the lubricant systems can ensure a steady supply of lubricant for lubricating the various components of the gearboxes, e.g., the bearing pin, the planet gears, and/or the journal bearings. The steady supply of lubricant helps ensure adequate clearance between these components, thereby further reducing the likelihood of direct metal-to-metal contact, e.g., between the pin outer surface and the inner surface of the planet gear rim and/or between various surfaces of the journal bearings. In this way, the inclusion of the disclosed lubricant systems has been discovered to be particularly useful for increasing the performance and reliability of the disclosed gearboxes.

These and other features, aspects, and/or advantages of the present disclosure will become better understood with reference to the following description and the claims. The accompanying drawings, which are incorporated in and constitute a part of this specification, illustrate embodiments of the disclosed technology and, together with the description, serve to explain the principles of the disclosure.

3

Figure 2:
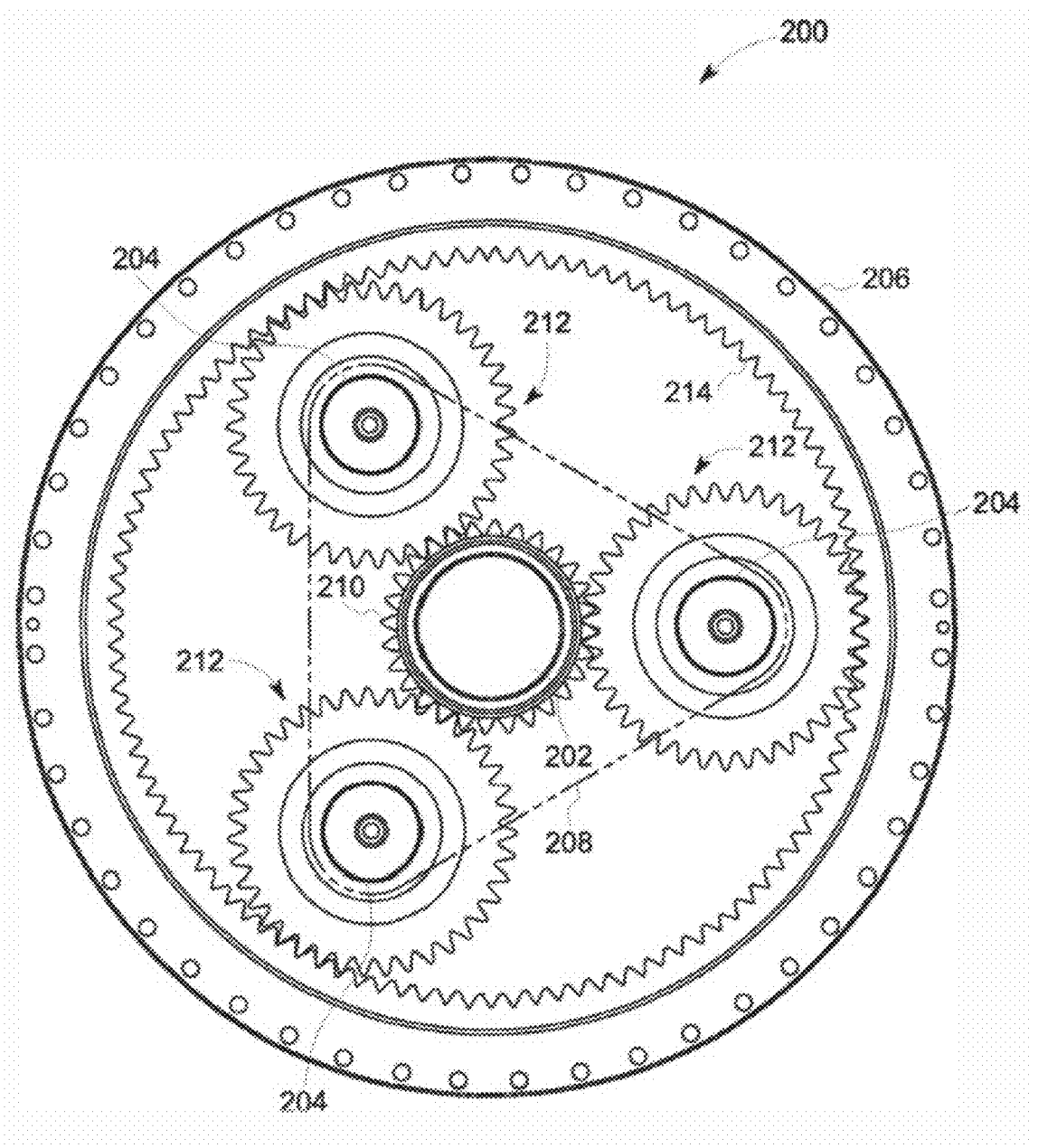

FIG. 2 shows a schematic diagram of an exemplary epicyclic gear train used with the gas turbine engine, according to one example.

Figure 3:
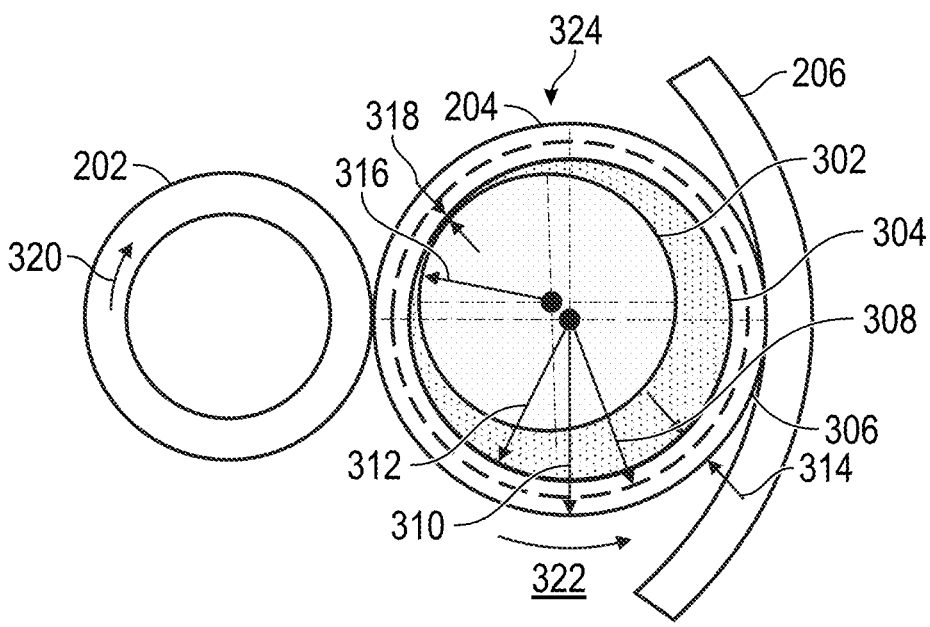

FIG. 3 shows a partial schematic diagram of the epicyclic gear train, according to one example.

Figure 4:
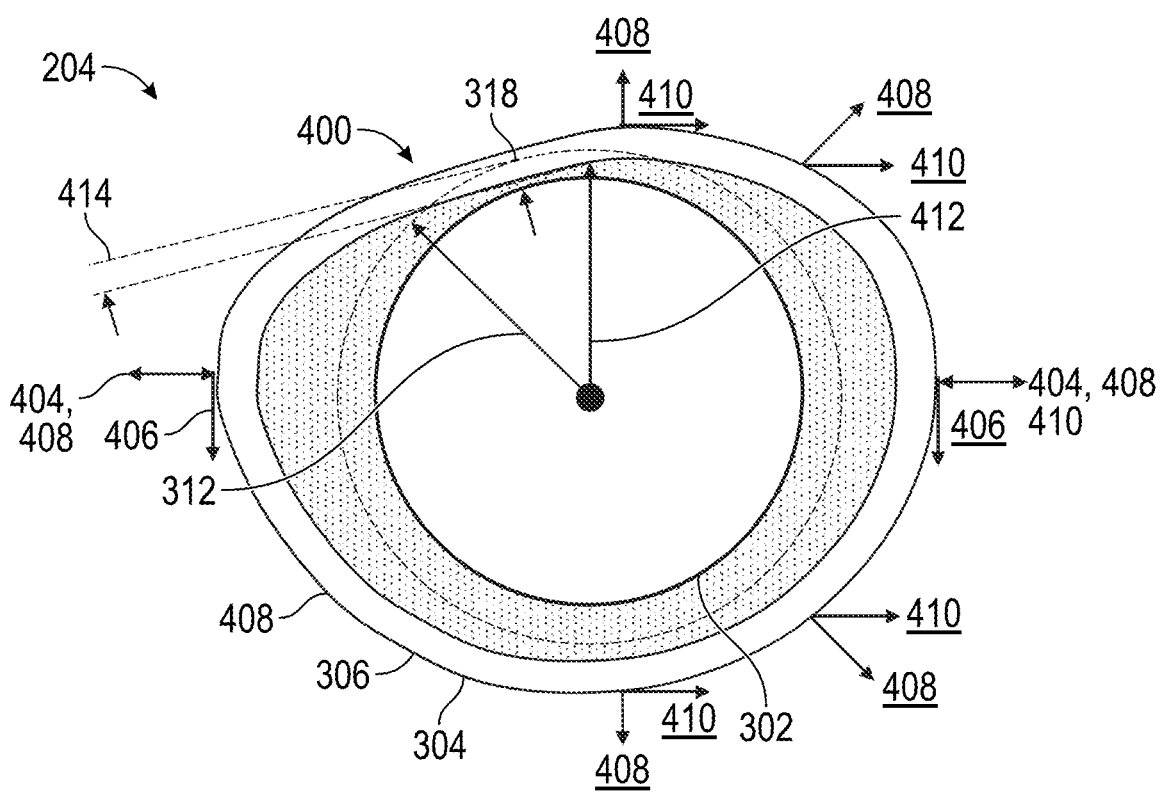

FIG. 4 shows a schematic diagram of the planet gear shown in FIG. 3 with the resultant tangential, radial, pinch, and centrifugal forces causing the planet gear rim to deform, according to one example.

FIG. 5 shows exemplary pin clearance parameters for exemplary epicyclic gear trains, according to one example.

FIG. 6 shows exemplary ranges of values for epicyclic gear train characteristics, according to one example.

Figure 7:
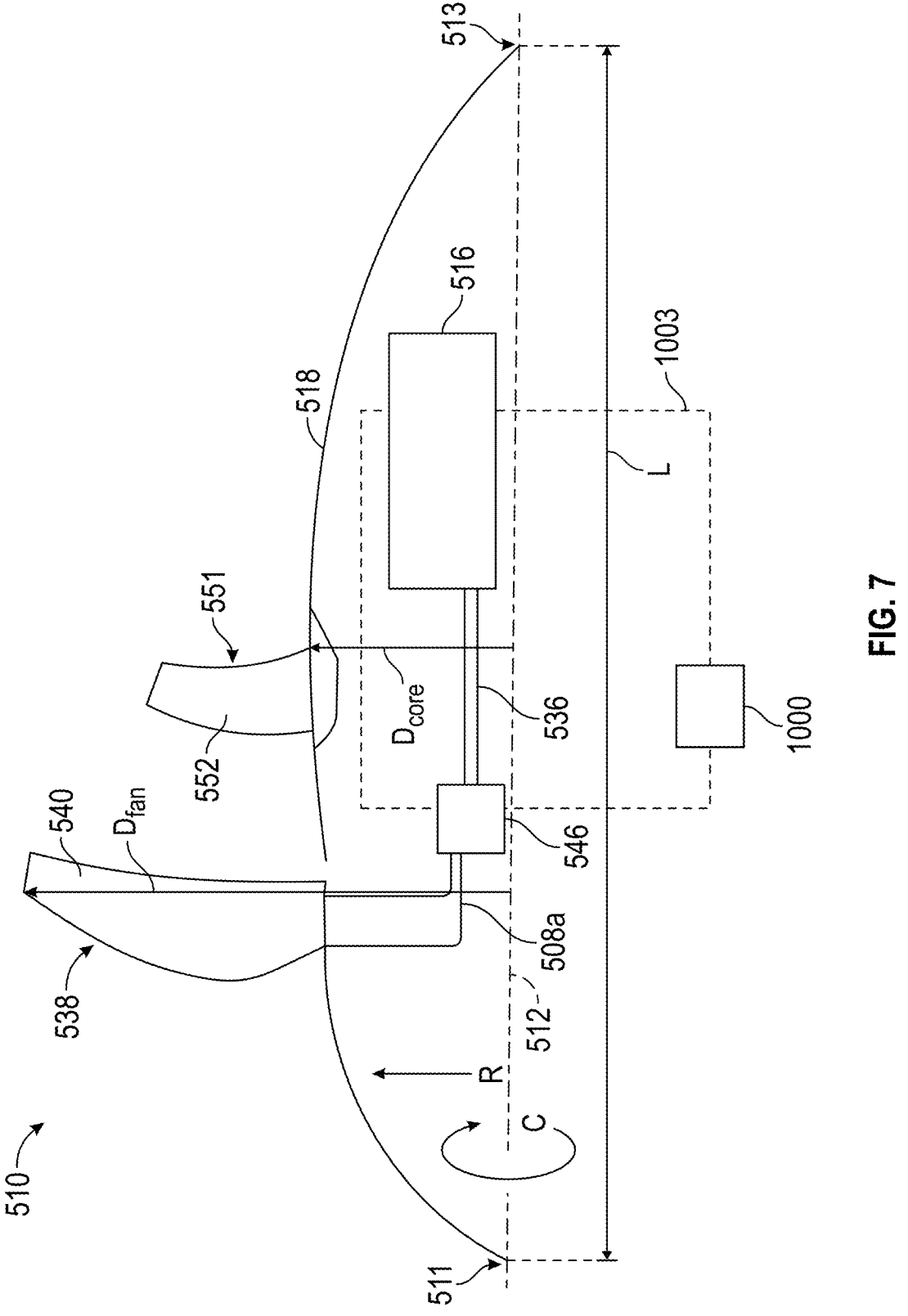

FIG. 7 is a cross-sectional schematic illustration of an exemplary embodiment of a gas turbine engine configured with an open rotor propulsion system.

Figure 8:
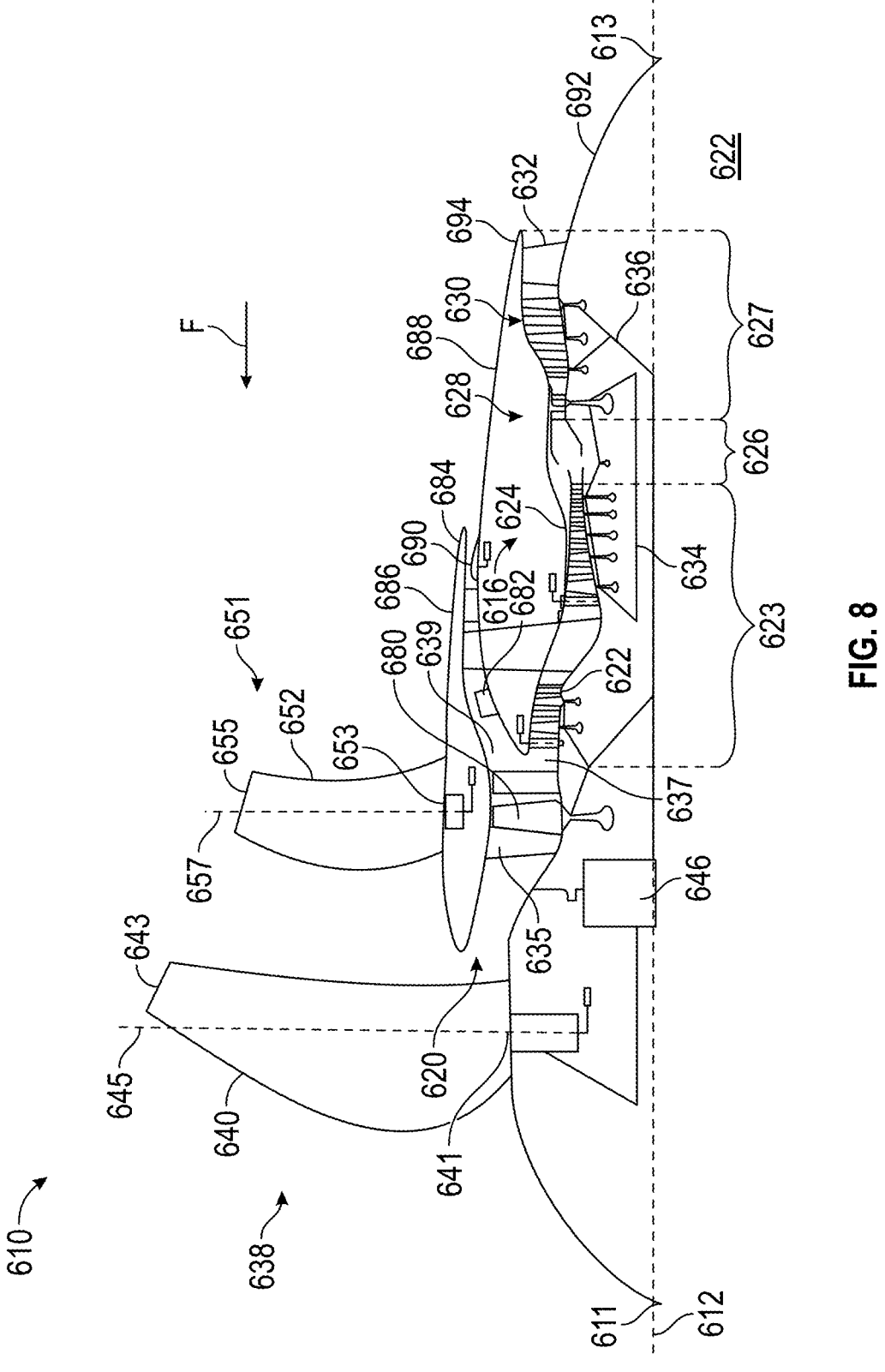

FIG. 8 is a cross-sectional schematic illustration of an exemplary embodiment of a gas turbine engine configured with an open rotor propulsion system.

Figure 9:
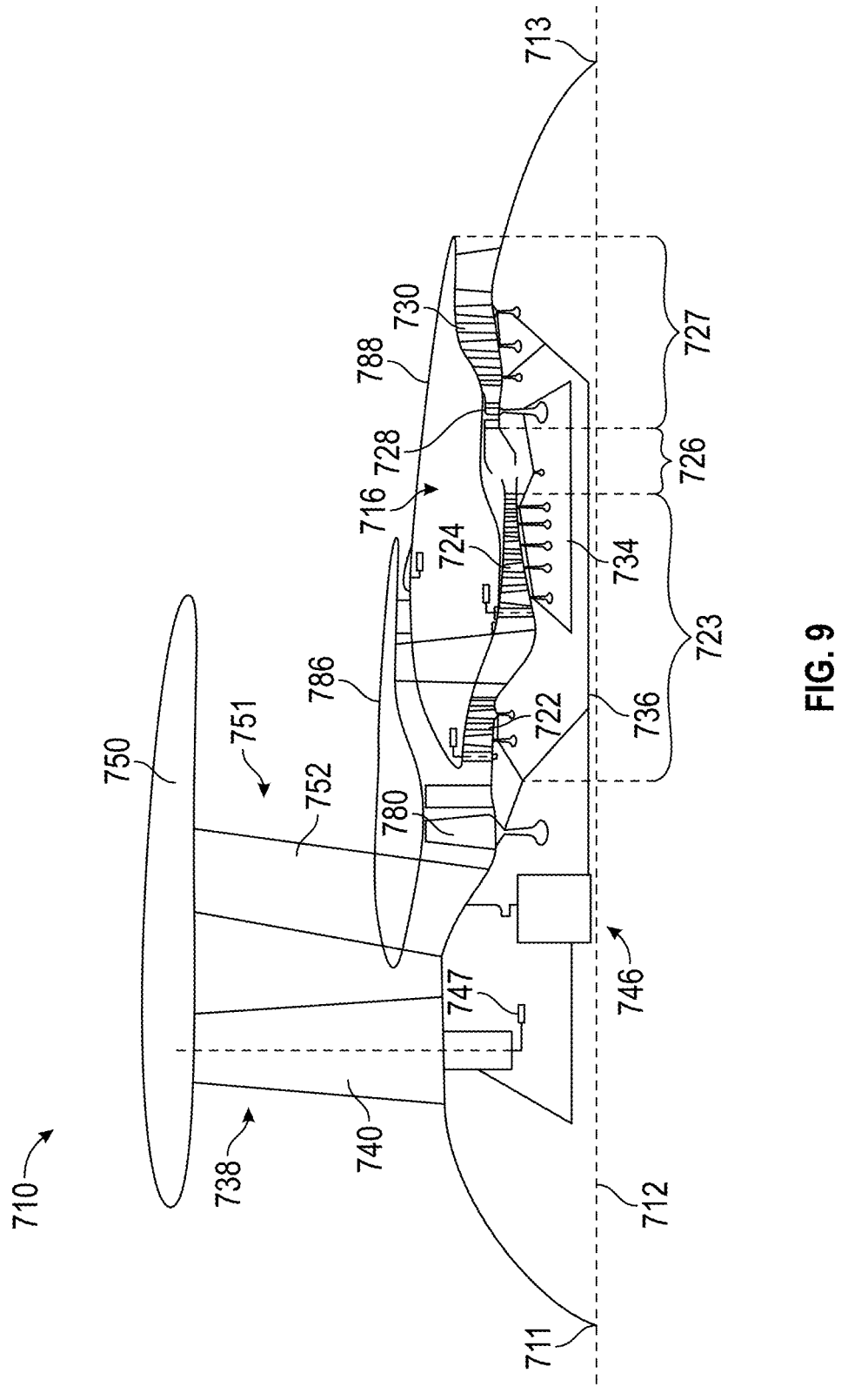

FIG. 9 is a cross-sectional schematic illustration of an exemplary embodiment of a gas turbine engine configured with a ducted propulsion system.

Figure 10:
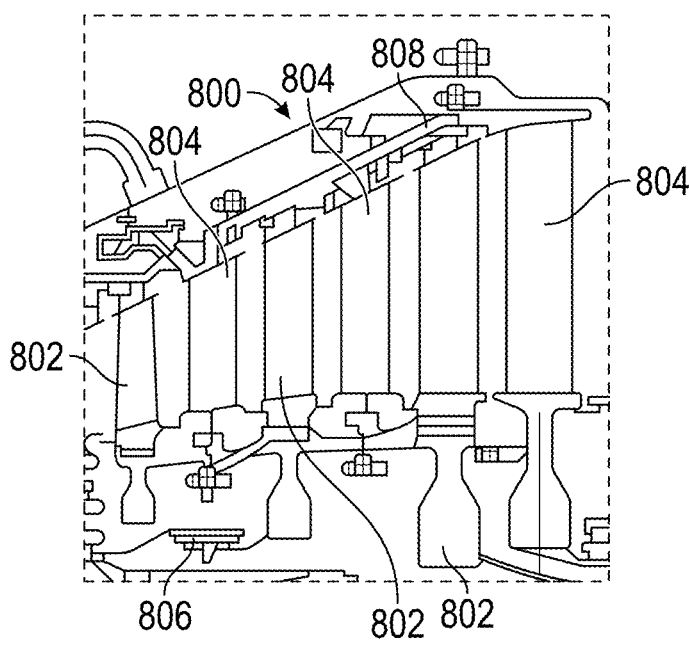

FIG. 10 is a cross-sectional schematic illustration of an exemplary embodiment of a counter-rotating low-pressure turbine of a gas turbine engine, the low-pressure turbine having a 3×3 configuration.

Figure 11:
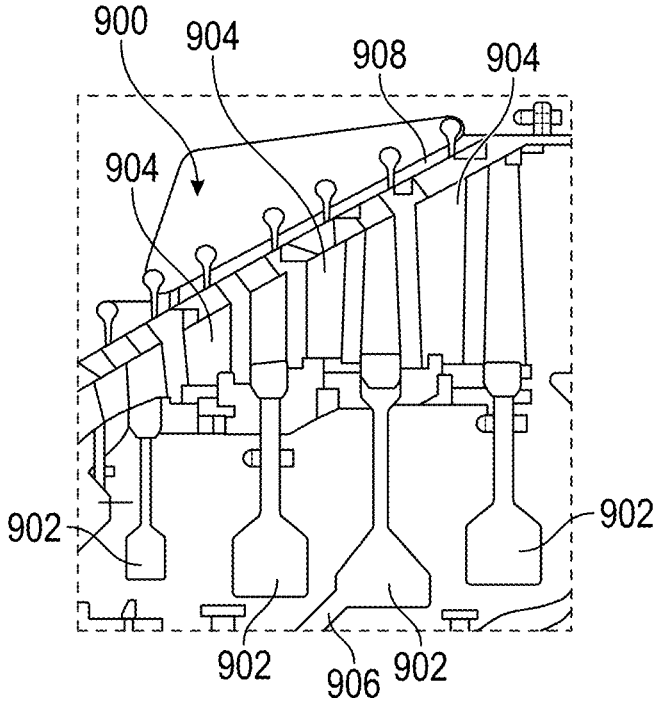

FIG. 11 is a cross-sectional schematic illustration of an exemplary embodiment of a counter-rotating low-pressure turbine of a gas turbine engine, the low-pressure turbine having a 4×3 configuration.

Figure 12:
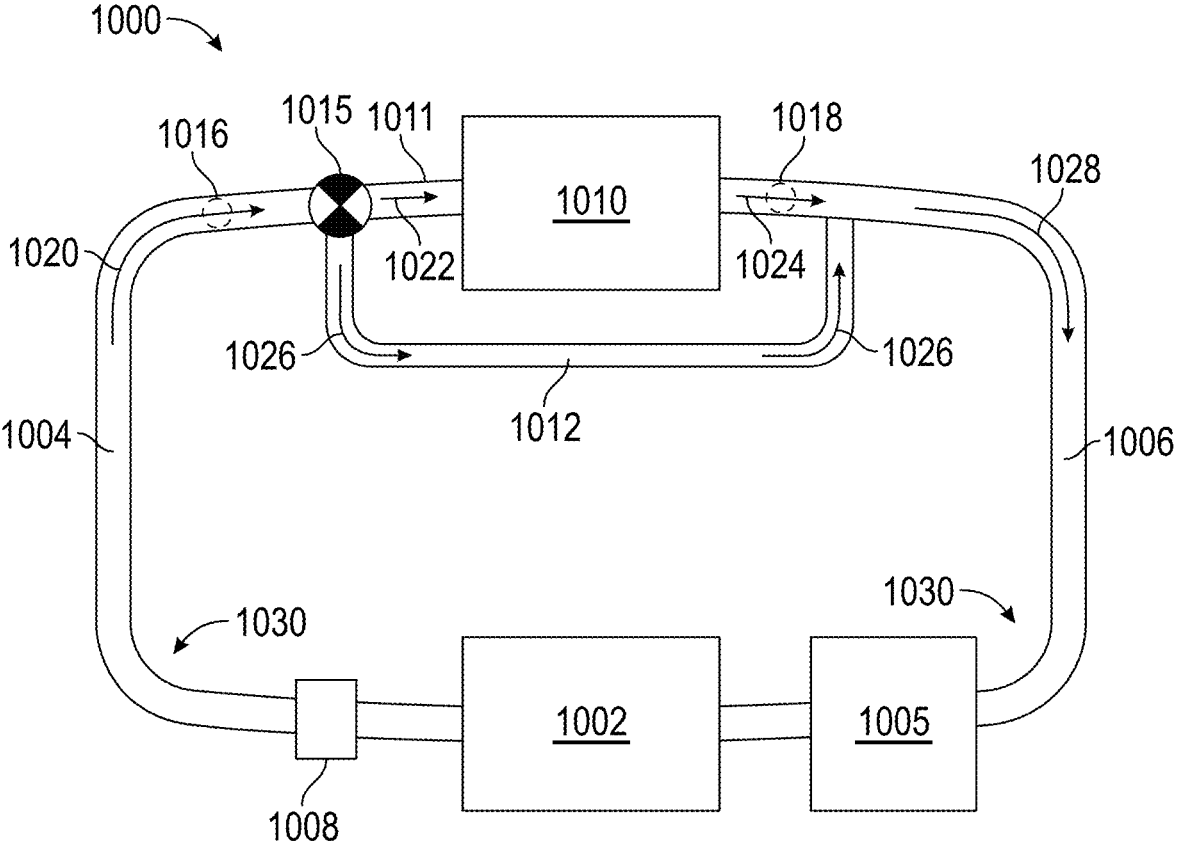

FIG. 12 is a schematic diagram of an exemplary lubricant system supplying lubricant to an engine component.

Figure 13:
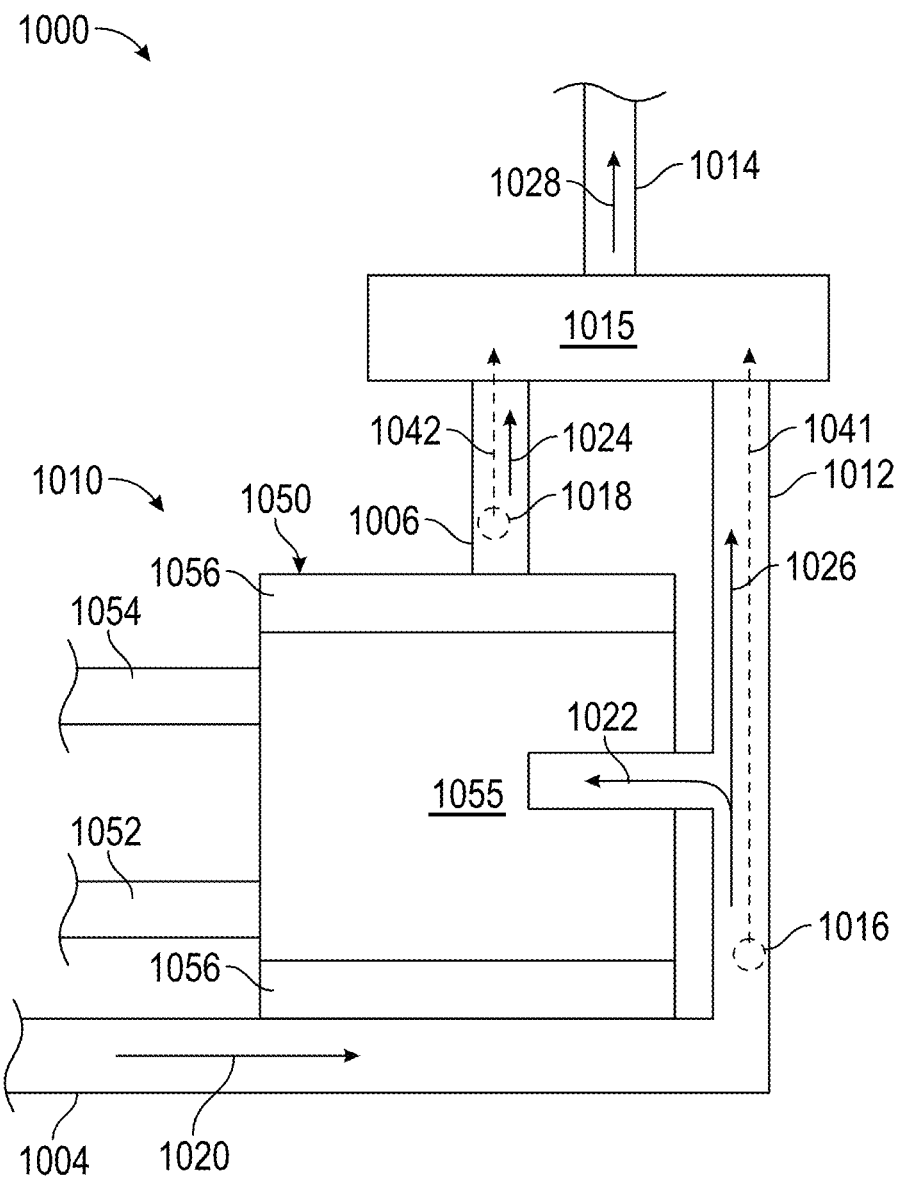

FIG. 13 is a schematic diagram of the lubricant system configured to supply lubricant to a gearbox.

DETAILED DESCRIPTION

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiments or examples are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

The word "exemplary" is used herein to mean "serving as an example, instance, or illustration." Any implementation described herein as "exemplary" is not necessarily to be construed as preferred or advantageous over other implementations.

As used herein, the terms "a," "an," and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "takeoff conditions" and "max takeoff condition" refer to conditions for the operation of a gas turbine engine at sea-level elevation, standard pressure, extreme hot day temperature, and a flight velocity of up to about 0.25 Mach.

The term "extreme hot day temperature" refers to the extreme hot day temperature specified for a particular gas turbine engine. This can include the extreme hot day temperature used for engine certification. Extreme hot day temperature can additionally or alternatively include temperatures of about 130-140° F.

The term "cruise flight altitude" refers to an altitude at which an aircraft levels after climb and prior to descending to an approach flight phase. In some embodiments, the engine is applied to a vehicle with a cruise altitude up to approximately 65,000 ft. In some embodiments, cruise altitude is between approximately 28,000 ft. and approximately 45,000 ft. In some embodiments, cruise altitude is expressed in flight levels (FL) based on a standard air pressure at sea level, in which a cruise flight condition is between FL280 and FL650. In another embodiment, cruise flight condition is between FL280 and FL450. In some embodiments, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In some embodiments, cruise altitude is between approximately 4.85 psia and approximately 2.14 psia. It should be appreciated that in some embodiments, the ranges of cruise altitude defined by pressure may be adjusted based on a different reference sea-level pressure and/or sea-level temperature.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of a turbomachine engine or a gear assembly described hereinbelow may be manufactured or formed using any suitable process, such as an additive manufacturing process, such as a 3-D printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

Figure 1:
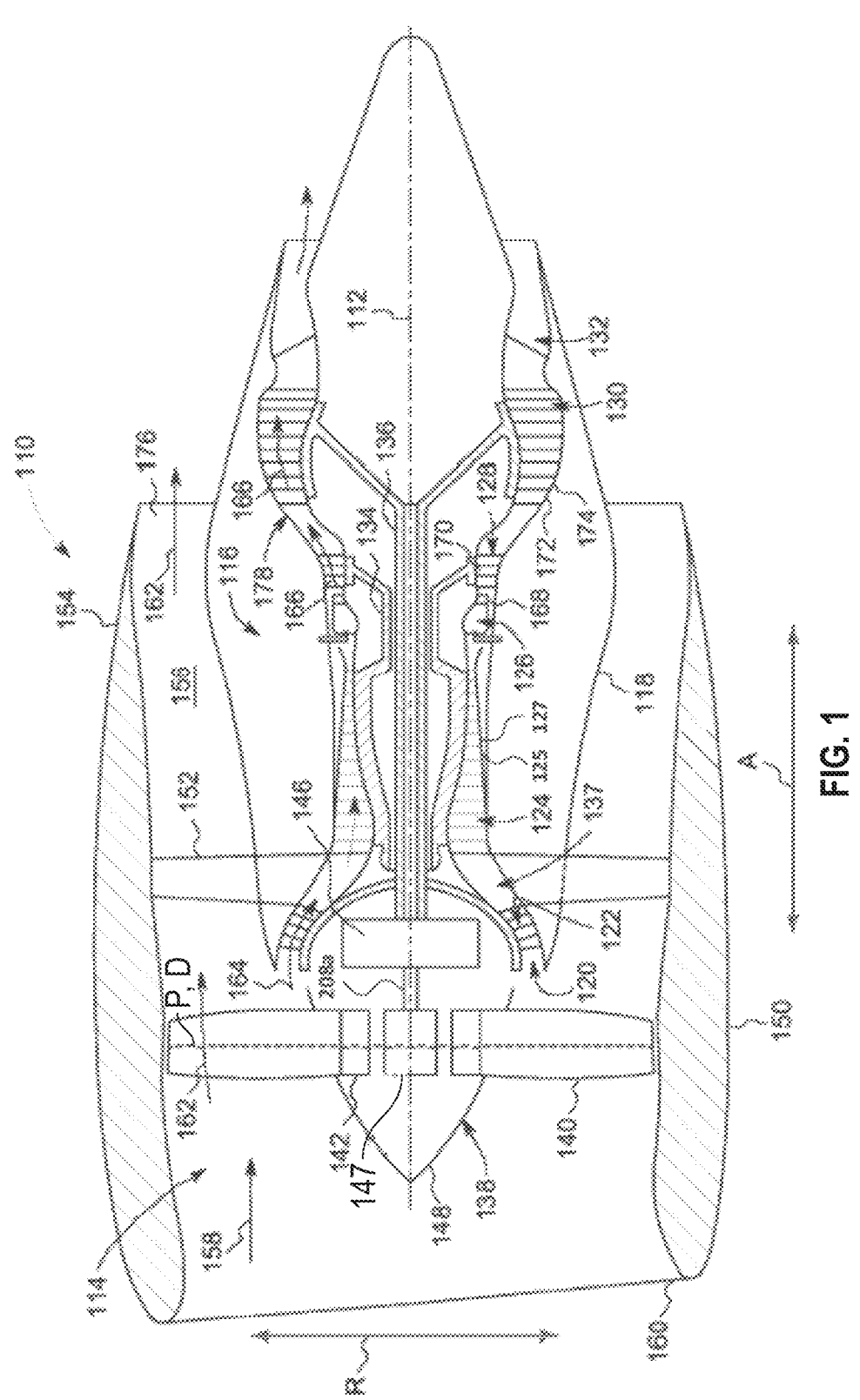
FIG. 1 shows a schematic view of an exemplary gas turbine engine, according to one example.

FIG. 1 is a schematic cross-sectional view of a gas turbine engine 110 in accordance with one example of the present disclosure. In this example, the gas turbine engine 110 can be a high-bypass turbofan jet engine, which can also be referred to as a turbofan engine. As shown in FIG. 1, the gas turbine engine 110 defines an axial direction A (extending parallel to a longitudinal centerline 112 provided for reference) and a radial direction R. The gas turbine engine 110 includes a fan section 114 and a core turbine engine 116 disposed downstream from the fan section 114.

The example core turbine engine 116 depicted includes a substantially tubular outer casing 118 that defines an annular inlet 120. The outer casing 118 encases, in a serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects the HP turbine 128 to the HP compressor (HPC) 124. A low pressure (LP) shaft or spool 136 drivingly connects the LP turbine 130 to the LP compressor 122. The compressor section 123, combustion section 126, turbine section, and the jet exhaust nozzle section 132 together define a core air flowpath 137.

In the illustrated example, the fan section 114 includes a fan 138, which can be variable pitch or fixed pitch, and a plurality of fan blades 140 coupled to a disk 142 in a spaced apart manner. The fan blades 140 extend outwardly from disk 142 generally along the radial direction R. Each fan blade 140 can be rotatable relative to the disk 142 about a pitch axis P (which is shown to be colinear with the line representing fan diameter D) by virtue of the fan blades 140 being operatively coupled to a suitable actuation member 147 (which is also referred to as a "pitch change member" or a "pitch change mechanism") configured to collectively vary the pitch of the fan blades 140. The plurality of fan blades 140, the disk 142, and the pitch change member 147 are together rotatable about the longitudinal axis 112 by a LP shaft 136 across a power gear box 146. The fan 138 defines a fan diameter (dashed line "D" in FIG. 1), which is the radial distance between the radially outermost tip portions of two opposing fan blades 140. In some examples, the fan diameter ranges from 80 inches to 95 inches. In other examples, the fan diameter ranges from 85 inches to 95 inches. In other examples, the fan diameter ranges from 72 to 216 inches. In other examples, the fan diameter ranges from 100 to 200 inches. In other examples, the fan diameter ranges from 120 to 190 inches. In other examples, the fan diameter ranges from 72 to 120 inches. In other examples, the fan diameter ranges from 50 to 80 inches.

The power gear box 146 includes a plurality of gears for adjusting the rotational speed of the fan 138 relative to the LP shaft 136 to a more efficient rotational fan speed. The power gear box 146, along with other examples of power gear boxes disclosed herein, is compatible with standard fans, variable pitch fans, or other configurations. The power gear box 146 may enable a speed change between the a first shaft and a second shaft, e.g., the LP shaft 136 and the fan shaft 208a, such as to reduce an output speed from one shaft to another shaft.

The power gear box 146 can be placed anywhere along the axial direction A to decouple the speed of the two shafts, whenever it is convenient to do so from a component efficiency point of view, e.g., decoupling a faster LP turbine from a slower fan and LP compressor or decoupling a faster LP turbine from a slower LP compressor and fan.

A rotatable front hub 148, which is aerodynamically contoured to promote an airflow through the plurality of fan blades 140, covers the disk 142. The front hub 148 can be aerodynamically contoured to promote an airflow through the plurality of fan blades 140. Additionally, the fan section 114 includes an annular fan casing or outer nacelle 150, which circumferentially surrounds the fan 138 and/or at least a portion of the core turbine engine 116. A plurality of circumferentially-spaced outlet guide vanes 152 supports the outer nacelle 150 relative to the core turbine engine 116. A downstream section 154 of the outer nacelle 150 extends over an outer portion of the core turbine engine 116 to define a bypass airflow passage 156 therebetween.

During the operation of the gas turbine engine 110, a volume of air 158 enters the gas turbine engine 110 through an associated inlet 160 of the outer nacelle 150 and/or the fan section 114. As the volume of air 158 passes across the plurality of fan blades 140, a second portion of air 164 is directed or routed into the core air flowpath 137, or more specifically into the LP compressor 122. The ratio of a first portion of air 162 routed through the bypass airflow passage 156 to the second portion of the air 164 is referred to as a "bypass ratio." The gas turbine engine 110 has a bypass ratio in a range from 12 to 15. The pressure of the second portion of air 164 increases as it is routed through the HP compressor 124 and into the combustion section 126, where the second portion of air 164 mixes with fuel and burned to provide combustion gases 166.

The HP compressor 124 comprises a plurality of HP compressor stages ("HPC stages") through which the combustion gases 166 are routed, wherein each HP compressor stage comprises a plurality of HP compressor rotor blades 125 arranged in a single row and coupled to the HP shaft 134. Each HP compressor stage further comprises a plurality of HP compressor stator vanes 127 arranged in a single row aft of the single row of HP compressor rotor blades 125 and coupled to the outer casing 118. The number of the plurality of HP compressor stages ranges from eight stages to ten stages. In some examples, the HP compressor 124 can have eight, nine, or ten HP compressor stages.

The combustion gases 166 are routed through the HP turbine 128, where a portion of thermal and/or kinetic energy from the combustion gases 166 is extracted via a sequence of HP turbine stator vanes 168, which can be coupled to the outer casing 118 and a plurality of HP turbine rotor blades 170. The plurality of HP turbine rotor blades 170, which can be coupled to the HP shaft 134, cause the HP shaft 134 to rotate and thereby support operation the HP compressor 124. The combustion gases 166 are then routed through the LP turbine 130, where a second portion of thermal and kinetic energy can be extracted from the combustion gases 166 via a sequence of LP turbine stator vanes 172, which are coupled to the outer casing 118, and a plurality of LP turbine rotor blades 174. The LP turbine rotor blades 174, which are coupled to the LP shaft or spool 136, cause the LP shaft 136 to rotate. The rotating LP shaft 136 causes the power gear box 146 to rotate the LP compressor 122 and/or the fan 138. The LP turbine 130 comprises a plurality of LP turbine stages ("LPT stages"), wherein each LP turbine stage comprises a sequence of one row of LP turbine stator vanes 172 arranged behind one row of LP turbine rotor blades 174. The number of LP turbine stages is in a range from three to six. This means that the LP turbine 130 can comprise three, four, five, or six LP turbine stages.

The combustion gases 166 are subsequently routed through the jet exhaust nozzle section 132 of the core turbine engine 116 to provide propulsive thrust. Simultaneously, the pressure of the first portion of air 162 is substantially increased as the first portion of air 162 is routed through the bypass airflow passage 156 before it is exhausted from a fan nozzle exhaust section 176 of the gas turbine engine 110, also providing propulsive thrust. The HP turbine 128, the LP turbine 130, and the jet exhaust nozzle section 132 at least partially define a hot gas path 178 for routing the combustion gases 166 through the core turbine engine 116.

The gas turbine engine 110 produces power-herein referred to as "fan power"-in a range from and including 7,000 horsepower to and including 80,000 horsepower at takeoff conditions.

The gas turbine engine 110 rotates the LP shaft 136 at a rate from 8,000 rpm to 10,000 rpm at takeoff conditions.

In some examples, the rate of rotation of the LP shaft 136 can be proportional to the rate of rotation of the fan 138. The rate of rotation of the fan 138, herein referred to as a "fan speed," ranges from 1,600 rpm to 3,334 rpm.

The example gas turbine engine 110 depicted in FIG. 1 should not be construed to preclude other suitable configurations of gas turbine engines (for example, the gas turbine engines depicted in FIGS. 7-9). It should also be appreciated that aspects of the present disclosure can be incorporated into any other suitable gas turbine engines in other examples. In some of these other examples, the present disclosure can be incorporated into a turboprop engine.

The gas turbine engine 110 generates significant loads on the LP shaft 136, which delivers the torque to the plurality of fan blades 140 through the fan shaft 208a. The power gear box 146 converts the high rate of rotation in the LP shaft 136 to the slower rate needed to maintain a desired tip speed in the plurality of fan blades 140, while the LP shaft 136 rotates at the higher rate for greater efficiency in extracting power from the LP turbine 130. Loads on the LP shaft 136 can exert significant forces on the gears within the power gear box 146. These loads include unevenly distributed loads on the journal bearings within the gears. Thus, there exists a need to manage the loads on the power gear box 146 to ensure safe and reliable operation of the power gear box 146.

FIG. 2 is a schematic diagram of an epicyclic gear train 200. In the illustrated example, the epicyclic gear train 200 is housed within the power gear box 146 of FIG. 1. In other examples, the epicyclic gear train 200 can be adjacent the power gear box 146 (FIG. 1) and can be mechanically coupled to the power gear box 146. The epicyclic gear train 200 includes a sun gear 202, a plurality of planet gears 204, a ring gear 206, and a carrier 208. Although the epicyclic gear train 200 is depicted in FIG. 2 as including three planet gears 204, the epicyclic gear train 200 can include any number of planet gears 204 that enable the operation of the epicyclic gear train 200 as described herein. The number of planet gears 204 is in a range from three planet gears 204 to six planet gears 204. In some examples, the number of planet gears 204 can be three, four, five, or six planet gears 204. The LP shaft 136 (FIG. 1) is coupled to the sun gear 202. The sun gear 202 engages the plurality of planet gears 204 through a plurality of complementary sun gear teeth 210 and a plurality of planet gear teeth 212 circumferentially spaced about a radially outer periphery of the sun gear 202 and a radially outer periphery of each of the plurality of planet gears 204, respectively. The plurality of planet gears 204 is maintained in a position relative to each other by the carrier 208. The plurality of planet gears 204 engage the ring gear 206 through a plurality of ring gear teeth 214 complementary to the planet gear teeth 212. The ring gear teeth 214 are circumferentially spaced about a radial inner periphery of the ring gear 206 and planet gear teeth 212 are circumferentially spaced about a radial outer periphery of each of the plurality of planet gears 204. The carrier 208 is rotationally coupled to the plurality of fan blades 140 through a fan shaft 208a, which drives the fan 138 through the delivered torque from the power gear box 146. The LP turbine 130 is coupled to the LP compressor 122.

A sum of the number of ring gear teeth 214 and sun gear teeth 210 divided by the number of sun gear teeth 210 is defined herein as the gear ratio (GR) of the epicyclic gear train 200. The gear ratio, which is dimensionless, is a value that can be from 2.5 to 5, 3.2 to 4.0, or 3.5 to 4.0.

The epicyclic gear train 200 is a planetary configuration, in which the ring gear 206 remains stationary while the sun gear 202, the plurality of planet gears 204, and the carrier 208 rotate. The LP shaft 136 drives the sun gear 202, which rotates the plurality of planet gears 204, which causes rotation in the carrier 208. The carrier 208 drives the plurality of fan blades 140 through the fan shaft 208a. When the epicyclic gear train 200 is in the planetary configuration, the sun gear 202 and the carrier 208 rotate in the same direction.

FIG. 3 is a partial and schematic diagram of the epicyclic gear train 200 in a planetary configuration showing a ring gear rim of the ring gear 206 and a planet gear rim 306 of the planet gear 204, a bearing pin 302, and a sun gear rim of the sun gear 202. In this figure the meshed engagement of sun gear 202, planet gear 204, and ring gear 206 from FIG. 3 are represented instead by the similar arrangement of these respective rims, which can be thought of as the portion of gears not including sun gear teeth 210, planet gear teeth 212, and ring gear teeth 214. Shown are each of the sun gears 202, planet gears 204, and ring gears 206 represented by a "rim" having an inner radius and outer radius as measured from the center of the planet gear.

The bearing pin 302 is located within the planet gear 204. A lubricant or fluid film 304 is disposed between the bearing pin 302 and the planet gear 204 to provide lubrication between the outer surface of the bearing pin 302 (i.e., a pin outer surface located at a radial distance 316 from the center of the bearing pin 302) and an inner surface of the planet gear 204 (located at a radial distance 312 from the center of the planet gear 204). The planet gear rim 306 is defined as the portion of the planet gear 204 from the inner surface of the planet gear 204 to the portion of the planet gear 204 located a radial distance 310 from the center of the planet gear 204 corresponding to a gear root radius (i.e., the radial location of the roots of the planet gear teeth 212). The planet gear rim 306 has a thickness 314 and a neutral axis of bending (as indicated by the dashed line) located at radial distance 308 from the center of the planet gear 204. The radial distance 308, hereinafter referred to as the bending stress neutral axis radius ($r_p$), is the radial location where normal stresses in the planet gear rim 306 associated with bending of the planet gear 204 in the plane of FIG. 3, e.g., pinching of the planet gear 204 between the sun gear 202 and ring gear 206, are equal to zero. The planet gear bending stress neutral axis radius ($r_p$) 308, measured in inches, is determined to be a value in a range from 1.5 inches to 4.0 inches according to the disclosure.

The carrier 208 (FIG. 2) is coupled to the bearing pin 302, such that rotation of the sun gear 202, which in turn causes the planet gears 204 to rotate, induces rotation in the carrier 208, which is coupled to the fan shaft 208a. Thus, torque from the LP shaft 136 is transferred via the sun gear 202, the planet gear 204, and the carrier 208 to the fan shaft 208a coupled to the plurality of fan blades 140. This torque transfer induces significant loads on the epicyclic gear train 200, both in terms of the loads generated by the torque transfer and the associated off-axis loads, as explained in greater detail below. Given this significant loading on such a power gear box, the design of the power gear box elements to ensure that metal to metal contact is avoided during high load conditions (i.e., takeoff) without imposing unacceptable burdens on the architecture in terms of weight, size, and thermal management systems is needed to support proper functioning.

Referring again to FIG. 3, the resultant loading of the epicyclic gear train 200 when a torque is transferred from the LP shaft 136 through the power gear box 146 and output to the fan shaft 208a urges the planet gear 204 (represented in FIG. 3 as the rim 306) towards the outer surface of the bearing pin 302, which in some examples can comprise a journal bearing without any rolling elements. The fluid film 304 is disposed between the inner surface of the planet gear 204 and the outer surface of the bearing pin 302 to avoid metal-to-metal contact between the parts and to permit the planet gear 204 to freely rotate about the bearing pin 302. The bearing pin 302 includes a bearing pin radius 316. A clearance ($c_r$) 318 is the minimum radial distance between the bearing pin 302 and the planet gear rim 306 when the power gear box 146 is under a loaded condition (i.e., when a torque is being transferred from the LP shaft 136 to the fan shaft 208a). The inventors determined that in order to reliably maintain operating conditions through a suitable number of cycles, taking into account the different aircraft mission requirements, the clearance ($c_r$) should be within a range of 0.00075 inches to 0.012 inches. If the clearance ($c_r$) were less than 0.00075 inches, then it is more likely that at least some metal-to-metal contact would result (resulting in higher friction, significant heat generation and possibly leading to gearbox failure). On the other hand, a clearance that is excessively high (above 0.012 inches) can also reduce bearing performance. The inventors found that with a clearance above 0.012 inches, the desired oil pressure between the pin and gear cannot be reliably maintained. The bearing stiffness is reduced if the clearance is too high.

The planet gear 204 can include at least one material selected from a plurality of alloys including, but not limited to, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some examples, the metal materials can be nitride to improve the life and resistance to particle damage. Planet gear 204 can include any combination of alloys and any percent weight range of those alloys that facilitates operation of the planet gear 204 as described herein, including but not limited to combinations of M50 Nil (AMS6278), Pyrowear 675 (AMS5930), and Ferrium C61 (AMS6517). The planet gear 204 can have a Young's modulus of elasticity which is dependent on the material used to construct the planet gear 204. The Young's modulus of elasticity is defined as the ratio of the stress (force per unit area) along an axis to the strain (ratio of deformation over initial length) along that axis in the range of stress in which Hooke's law holds.

During operation, when the epicyclic gear train 200 is in a planetary configuration, the LP shaft 136 (FIG. 1) rotates, applying a torque to the sun gear 202 in a clockwise direction as indicated by a first arrow 320. The sun gear 202, in turn, rotates, causing the planet gears 204 to rotate in a counter-clockwise direction as indicated by a second arrow 322. The planet gear 204, in turn, causes the carrier 208 (FIG. 2) to rotate in a clockwise direction as indicated by a third arrow 324.

FIG. 4 is a schematic diagram of the planet gear 204 with resultant radial, pinch, transverse, and centrifugal forces causing a deformation 400 of the planet gear rim 306. Torsion input from the LP shaft 136 (FIG. 1) causes the sun gear 202 (FIG. 2) to exert pinch component forces 404 and tangential component forces 406 on the planet gear rim 306. The pinch component forces 404 and the tangential component forces 406 are caused by the radial and tangential components, respectively, of the force exerted through the planet gear teeth 212 (FIG. 2) from the sun gear 202 on one side and from the ring gear 206 (FIG. 2) on the other side. The pinch component forces 404 are directed radially inwards at locations where the planet gear 204 contacts the sun gear 202 (FIG. 2) and the ring gear 206 (FIG. 2). The tangential component forces 406 are tangential to the planet gear rim 306 at locations where the planet gear 204 contacts the sun gear 202 (FIG. 2) and the ring gear 206 (FIG. 2).

Radial component forces 408 extend radially outwards from the center of the planet gear 204 resulting from a radial component of the force exerted on the planet gear 204 from the rotation of the planet gear 204 about the bearing pin 302. Centrifugal component forces 410 are the forces resulting from the precession of the planet gear 204 about the sun gear 202 (FIG. 2). In some examples, the centrifugal component forces 410 are greater in magnitude than the pinch component forces 404 and the tangential component forces 406.

The resultant pinch component forces 404, tangential component forces 406, radial component forces 408, and centrifugal component forces 410 cause deformation 400 of the planet gear rim 306. The pinch component forces 404 inwardly deform the planet gear rim 306 towards the bearing pin 302. The tangential component forces 406 elongate the planet gear rim 306 in a direction opposite the path of the planet gear 204. The radial component forces 408 deform the planet gear rim 306 in a radially outward direction. The centrifugal component forces 410 elongate the planet gear rim 306 in a direction radially outwards from the sun gear 202. The deformation 400 results in the clearance 318 being reduced by a change in clearance 414, which is a radial distance between the inner radius 312 and a deformed inner radius 412.

Enhanced performance of the epicyclic gear train 200 (FIG. 2) can be achieved when the clearance 318 is greater than the change in clearance 414. In other words, enhanced results can be achieved when the planet gear rim 306 does not deform or bend such that the planet gear rim 306 contacts the surface of the bearing pin 302 when resultant radial component forces 408, pinch component forces 404, tangential component forces 406, and centrifugal component forces 410 are exerted on the planet gear rim 306.

It is desirable to have the epicyclic gear train 200 (FIG. 2) designed to maintain a minimum clearance 318 during high load condition for a gas turbine engine 110, such as during a take-off, as this beneficially minimizes metal-to-metal contact within the planet gear 204.

The inventors discovered that a minimum clearance can be maintained by identifying the specific conditions of the gas turbine engine 110 likely to cause a maximum deformation of the planet gear 204 and relating those conditions to gearbox design. The inventors discovered a relationship that enabled them to determine an appropriate sizing for the planet gear 204 (specifically, the location of the planet gear bending stress neutral axis radius ($r_p$) 308) for a given number of planet gears 204 and gear ratio, based on the loading conditions for the gearbox during a takeoff condition so that a minimum clearance can be maintained. The relation discovered, referred to by the inventors as a pin clearance parameter (PCP) with units of revolutions per minute (rpm), is given in (1):

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right] \qquad (1)$$

wherein "$c_r$" is the clearance 318 of the bearing pin 302 (journal bearing) measured in inches, "GR" is the gear ratio defined as the ratio of the sum of the number of ring gear teeth 214 and sun gear teeth 210 divided by the number of sun gear teeth 210, "$r_p$" is the planet gear bending stress neutral axis radius 308 measured in inches, "$N_p$" is the number of planet gears 204, "$HP_{fan}$" is the fan power, measured in horsepower, of the gas turbine engine 110 based on takeoff conditions, and "$\Omega_{fan}$" is the fan speed, measured in rpm, of the gas turbine engine 110 at on takeoff conditions measured in rpm. A first constant, $K_1$, has a value of $1.96\times10^{-5}$ per horsepower-minute-inch ($\text{hp}^{-1}\cdot\text{min}^{-1}\cdot\text{in.}^{-1}$). A second constant, $K_2$, has a value of $4.91\times10^{-9}$ horsepower-minutes cubed per cubic inch ($\text{hp}\cdot\text{min}^3/\text{in.}^3$). The inventors found that if the following inequality was satisfied, a minimum clearance can be maintained during takeoff conditions:

$$0\,rpm \leq PCP \leq 3.334\,rpm \qquad (2)$$

In other examples, where a design space is more limited by engine architecture or gearbox design, the range in (2) can be greater than or equal to zero rpm and less than or equal to 3,000 rpm, greater than or equal to 48 rpm and less than or equal to 3,000 rpm, greater than or equal to 48 rpm and less than or equal to 1,334 rpm, or greater than or equal to 80 rpm and less than or equal to 1,300 rpm.

FIG. 5 discloses gear ratios, fan powers, fan speeds, numbers of gears, planet gear bending stress neutral axis radii 308 (FIG. 4), clearances 318 (FIG. 4), and pin clearance parameters for multiple exemplary epicyclic gear trains 200 (FIG. 2).

FIG. 6 discloses units and exemplary ranges for gear ratios, fan powers, fan speeds, numbers of gears, planet gear bending stress neutral axis radii 308 (FIG. 4), clearances 318 (FIG. 4), and pin clearance parameters.

FIG. 7 is an exemplary embodiment of an engine 510 including a gearbox assembly 546 according to one embodiment of the present disclosure. The engine 510 includes a fan assembly 538 driven by a core engine 516. In various embodiments, the core engine 516 can be a Brayton cycle system configured to drive the fan assembly 538. The core engine 516 is at least partially shrouded by an outer casing 518. The fan assembly 538 includes a plurality of fan blades 540. A vane assembly 551 extends from the outer casing 518 in a cantilevered manner. Thus, the vane assembly 551 is also be referred to as an "unducted vane assembly." The vane assembly 551, including a plurality of vanes 552, is positioned in operable arrangement with the fan blades 540 to provide thrust, control thrust vector, abate or re-direct undesired acoustic noise, and/or otherwise desirably alter a flow of air relative to the fan blades 540.

In some embodiments, the number of fan blades 540 of the fan assembly 538 is in a range from eight to twenty, such as from ten to eighteen, twelve to sixteen, ten, and/or twelve. some embodiments, the vane assembly 551 can include three to thirty vanes 552. In some embodiments, the vane assembly 551 can include an equal or fewer quantity of vanes 552 to fan blades 540. For example in particular embodiments, the engine 510 includes twelve fan blades 540 and ten vanes 552. In some embodiments, the vane assembly 551 includes a greater quantity of vanes 552 to fan blades 540; for example, the engine 510 can include ten fan blades 540 and twenty-three vanes 552.

In the embodiment shown in FIG. 7, the vane assembly 551 is positioned downstream or aft of the fan assembly 538. However, in some embodiments, the vane assembly 551 may be positioned upstream or forward of the fan assembly 538. In some embodiments, the engine 510 may include a first vane assembly positioned forward of the fan assembly 538 and a second vane assembly positioned aft of the fan assembly 538. The fan assembly 538 may be configured to adjust pitch at one or more fan blades 540, such as to control thrust vector, abate or re-direct noise, and/or alter thrust output. The vane assembly 551 may be configured to adjust pitch at one or more vanes 552, such as to control thrust vector, abate or re-direct noise, and/or alter thrust output. Pitch control mechanisms at one or both of the fan assembly 538 or the vane assembly 551 may co-operate to produce one or more effects described above.

In some embodiments, such as the embodiment depicted in FIG. 7, the engine 510 can be an un-ducted gas turbine engine, such that the plurality of fan blades 540 is unshrouded by a nacelle or a fan casing. As such, in various embodiments, the engine 510 may be configured as an unshrouded gas turbine engine, an open rotor engine, or a propfan engine. In some embodiments, the engine 510 can be an unducted rotor engine with a single row of fan blades 540. The fan blades 540 can have a large diameter, such as may be suitable for high bypass ratios, high cruise speeds (e.g., comparable to aircraft with gas turbine engines, or generally higher cruise speed than aircraft with turboprop engines), high cruise altitude (e.g., comparable to aircraft with gas turbine engines, or generally higher cruise speed than aircraft with turboprop engines), and/or relatively low rotational speeds.

The fan blades 540 comprise a diameter ($D_{fan}$). For illustrative purposes, only half of the $D_{fan}$ is shown (i.e., the radius of the fan). In some embodiments, the $D_{fan}$ can be in a range from 72 inches to 216 inches. In some embodiments, the $D_{fan}$ can be in a range from 100 inches to 200 inches. In some embodiments, the $D_{fan}$ can be in a range from 120 inches to 190 inches. In some embodiments, the $D_{fan}$ can be in a range from 80 inches to 95 inches. In some embodiments, the $D_{fan}$ can be in a range from 85 inches to 90 inches. In some embodiments, the $D_{fan}$ can be in a range from 72 inches to 120 inches. In some embodiments, the $D_{fan}$ can be in a range from 50 inches to 80 inches.

In some embodiments, the fan blade tip speed at a cruise flight condition can be 650 to 900 fps, or 700 to 800 fps. A fan pressure ratio (FPR) for the fan assembly 104 can be in a range from 1.04 to 1.10, or in some embodiments in a range from 1.05 to 1.08, as measured across the fan blades at a cruise flight condition.

As shown in FIG. 7, the core engine 516 is encased in outer casing 518 defining one half of a core diameter ($D_{core}$), which may be thought of as the maximum extent from the centerline axis (datum for R). In some embodiments, the engine 510 can include a length (L) from a longitudinally (or axial) forward end 511 to a longitudinally aft end 513. In some embodiments, the engine 510 can define a ratio of $L/D_{core}$ providing for reduced installed drag. In one embodiment, $L/D_{core}$ can be at least 2. In another embodiment, $L/D_{core}$ is at least 2.5. In some embodiments, the $L/D_{core}$ can be less than 5, less than 4, and less than 3. In some embodiments, it should be appreciated that the $L/D_{core}$ can be for a single unducted rotor engine.

The reduced installed drag may further provide for improved efficiency, such as improved specific fuel consumption. Additionally or alternatively, the reduced drag may provide for cruise altitude engine and aircraft operation at or above Mach 0.5. In certain embodiments, the $L/D_{core}$, the fan assembly 538, and/or the vane assembly 551 separately or together can allow, at least in part, the engine 510 to operate at a maximum cruise altitude operating speed between approximately Mach 0.55 and approximately Mach 0.85; or between approximately 0.72 to 0.85 or between approximately 0.75 to 0.85.

Referring still to FIG. 7, the core engine 516 extends in a radial direction (R) relative to an engine centerline axis 512. The gearbox assembly 546 receives power or torque from the core engine 516 through a power input source 536 and provides power or torque to drive the fan assembly 538, in a circumferential direction C about the engine centerline axis 512, through a power output source 508*a*. The gearbox assembly 546 includes the epicyclic gear train 200 of FIGS. 2-3. Thus, the gearbox assembly 546 includes the sun gear 202, the plurality of planet gears 204, the ring gear 206, and the carrier 208 arranged in a planetary configuration. Furthermore, the gearbox assembly 546 is characterized by a pin clearance parameter in a range from zero rpm to 3,334 rpm, such as from zero rpm to 3,000 rpm, from 48 rpm to 3,000 rpm, from 48 rpm to 1,334 rpm, and/or from 80 rpm to 1,300 rpm.

FIG. 8 shows a cross-sectional view of an engine 610, which is configured as an exemplary embodiment of an open rotor propulsion engine. The engine 610 is generally similar to the engine 510 and corresponding components have been numbered similarly. For example, the gearbox assembly of the engine 510 is numbered "546" and the gearbox assembly of the engine 610 is numbered "646," and so forth. In addition to the gearbox assembly 646, the engine 610 includes a fan assembly 638 that includes a plurality of fan blades 640 distributed around an engine centerline axis 612. Fan blades 640 are circumferentially arranged in an equally spaced relation around the engine centerline axis 612, and each fan blade 640 has a root 641 and a tip 643, and an axial span defined therebetween, as well as a central blade axis 645.

As shown, the core engine 616 includes a compressor section 623, a combustion section 626, and a turbine section 627 (which may be referred to as "an expansion section") together in a serial flow arrangement. The core engine 616 extends circumferentially relative to the engine centerline axis 612. The core engine 616 includes a high-speed spool that includes a high-speed compressor 624 and a high-speed turbine 628 operably rotatably coupled together by a high-speed shaft 634. The combustion section 626 is positioned between the high-speed compressor 624 and the high-speed turbine 628.

The combustion section 626 may be configured as a deflagrative combustion section, a rotating detonation combustion section, a pulse detonation combustion section, and/or any other appropriate heat addition system. The combustion section 626 may be configured as one or more of a rich-burn system or a lean-burn system, or any suitable combination(s) thereof. In some embodiments, the combustion section 626 can include an annular combustor, a can combustor, a cannular combustor, a trapped vortex combustor (TVC), or any other appropriate combustion system, or any suitable combination(s) thereof.

The core engine 616 also includes a booster or low-pressure compressor 622 positioned in flow relationship with the high-pressure compressor 624. The low-pressure compressor 622 is rotatably coupled with the low-pressure turbine 630 via a low-speed shaft 636 to enable the low-pressure turbine 630 to drive the low-pressure compressor 622. The low-speed shaft 636 is also operably connected to the gearbox assembly 646 to provide power to the fan assembly 638, such as described further herein.

It should be appreciated that the terms "low" and "high," or their respective comparative degrees (e.g., "lower" and "higher," where applicable), when used in connection with the compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein, the stage count includes the number of rotors or blade stages in a particular component (e.g., a compressor or turbine). For example, in some embodiments, a low-pressure compressor can comprise 1-8 stages, a high-pressure compressor can comprise 8-15 stages (e.g., 8-10 stages), a high-pressure turbine comprises 1-2 stages, and/or a low-pressure turbine comprises 3-7 stages (e.g., 3-6 stages). For example, in some embodiments, an engine can comprise a one stage low-pressure compressor, an 11 stage high-pressure compressor, a two stage high-pressure compressor, and a 7 stage low-pressure turbine. As another example, in some embodiments, an engine can comprise a three stage low-pressure compressor, a 10 stage high-pressure compressor, a two stage high-pressure compressor, and a 7 stage low-pressure turbine.

In some embodiments, a low-pressure turbine can be a counter-rotating low-pressure turbine comprising inner blade stages and outer blade stages. The inner blade stages extend radially outwardly from an inner shaft, and the outer blade stages extend radially inwardly from an outer drum. In some embodiments, the counter-rotating low-pressure turbine can include three inner blade stages and three outer blade stages, which can collectively be referred to as a "six stage low-pressure turbine." In some embodiments, the counter-rotating low-pressure turbine can include four inner blade stages and three outer blade stages, which can be collectively be referred to as a "seven stage low-pressure turbine."

As discussed in more detail below, the core engine 616 includes the gearbox assembly 646 configured to transfer power from the turbine section 627 and reduce an output rotational speed at the fan assembly 638 relative to the low-speed turbine 630. The gearbox assembly 646 includes the epicyclic gear train 200 of FIGS. 2-3. Thus, the gearbox assembly 646 includes the sun gear 202, the plurality of planet gears 204, the ring gear 206, and the carrier 208 arranged in a planetary configuration. Furthermore, the gearbox assembly 646 is characterized by a pin clearance parameter in a range from zero rpm to 3,334 rpm, such as from zero rpm to 3,000 rpm, from 48 rpm to 3,000 rpm, from 48 rpm to 1,334 rpm, and/or from 80 rpm to 1,300 rpm.

The engine 610 also includes a vane assembly 651 comprising a plurality of vanes 652 disposed around engine centerline axis 612. Each vane 652 defines a root 653 and a tip 655, and a span defined therebetween. Vanes 652 can be arranged in a variety of manners. In some embodiments, for example, they are not all equidistant from the rotating assembly.

In some embodiments, vanes 652 are mounted to a stationary frame and do not rotate relative to the engine centerline axis 612, but may include a mechanism for adjusting their orientation relative to their axis 657 and/or relative to the fan blades 640. For reference purposes, FIG. 8 depicts a forward direction denoted with arrow F, which in turn defines the forward and aft portions of the system.

As shown in FIG. 8, the fan assembly 638 is located forward of the core engine 616 with the exhaust 256 located aft of core engine 616 in a "puller" configuration. Other configurations are possible and contemplated as within the scope of the present disclosure, such as what may be termed a "pusher" configuration embodiment in which the core engine 616 is located forward of the fan assembly 638. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 640, 652) such that the fan assembly 638 rotates clockwise for one propulsion system and counter-clockwise for the other propulsion system. Alternatively, an optional reversing gearbox can be provided to permits a common gas turbine core and low-pressure turbine to be used to rotate the fan blades either clockwise or counter-clockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

It may be desirable that either or both of the fan blades 640 or the vanes 652 to incorporate a pitch change mechanism such that the blades can be rotated with respect to an axis of pitch rotation (annotated as 645 and 657, respectively) either independently or in conjunction with one another. Such pitch change mechanisms can be utilized to vary thrust and/or swirl effects under various operating conditions, including to provide a thrust reversing feature which may be useful in certain operating conditions such as upon landing an aircraft.

Vanes 652 can be sized, shaped, and configured to impart a counteracting swirl to the fluid so that in a downstream direction aft of both fan blades 640 and vanes 652 the fluid has a greatly reduced degree of swirl, which translates to an increased level of induced efficiency. Vanes 652 may have a shorter span than fan blades 640, as shown in FIG. 8. For example, vanes 652 may have a span that is at least 50% of a span of fan blades 640. In some embodiments, the span of the vanes 652 can be the same or longer than the span as fan blades 640, if desired. Vanes 652 may be attached to an aircraft structure associated with the engine 610, as shown in FIG. 8, or another aircraft structure such as a wing, pylon, or fuselage. Vanes 652 may be fewer or greater in number than, or the same in number as, the number of fan blades 640. In some embodiments, the number of vanes 652 are greater than two, or greater than four, in number. Fan blades 640 may be sized, shaped, and contoured with the desired blade loading in mind.

In the embodiment shown in FIG. 8, an annular 360-degree inlet 620 is located between the fan assembly 638 and the vane assembly 651, and provides a path for incoming atmospheric air to enter the core engine 616 radially inwardly of at least a portion of the vane assembly 651. Such a location may be advantageous for a variety of reasons, including management of icing performance as well as protecting the inlet 620 from various objects and materials as may be encountered in operation.

In the exemplary embodiment of FIG. 8, in addition to the open rotor or unducted fan assembly 638 with its plurality of fan blades 640, an optional ducted fan assembly 680 is included behind fan assembly 638, such that the engine 610 includes both a ducted and an unducted fan which both serve to generate thrust through the movement of air at atmospheric temperature without passage through the core engine 616. The ducted fan assembly 680 is shown at about the same axial location as the vane 652, and radially inward of the root 653 of the vane 652. Alternatively, the ducted fan assembly 680 may be between the vane 652 and core duct 637, or be farther forward of the vane 652. The ducted fan assembly 680 may be driven by the low-pressure turbine 630, or by any other suitable source of rotation, and may serve as the first stage of the low-pressure compressor 622 or may be operated separately. Air entering the inlet 620 flows through an inlet duct 635 and then is divided such that a portion flows through a core duct 637 and a portion flows through a fan duct 639. Fan duct 639 may incorporate heat exchangers 682 and exhausts to the atmosphere through an independent fixed or variable nozzle 684 aft of the vane assembly 651, at the aft end of the fan cowl 686 and outside of the engine core cowl 688. Air flowing through the fan duct 266 thus "bypasses" the core of the engine and does not pass through the core.

Thus, in the exemplary embodiment, engine 610 includes an unducted fan formed by the fan blades 640, followed by the ducted fan assembly 680, which directs airflow into two concentric or non-concentric ducts 637 and 639, thereby forming a three-stream engine architecture with three paths for air which passes through the fan assembly 638.

In the exemplary embodiment shown in FIG. 8, a slidable, moveable, and/or translatable plug nozzle 690 with an actuator may be included in order to vary the exit area of the nozzle 684. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 684 has a consistent "home" position to which it returns in the event of any system failure, which may prevent commands from reaching the nozzle 684 and/or its actuator.

In some embodiments, a mixing device 692 can be included in a region aft of a core nozzle 694 to aid in mixing the fan stream and the core stream to improve acoustic performance by directing core stream outward and fan stream inward.

Since the engine 610 shown in FIG. 8 includes both an open rotor fan assembly 638 and a ducted fan assembly 680, the thrust output of both and the work split between them can be tailored to achieve specific thrust, fuel burn, thermal management, and/or acoustic signature objectives which may be superior to those of a typical ducted fan gas turbine propulsion assembly of comparable thrust class. The ducted fan assembly 680, by lessening the proportion of the thrust required to be provided by the unducted fan assembly 638, may permit a reduction in the overall fan diameter of the unducted fan assembly and thereby provide for installation flexibility and reduced weight.

Operationally, the engine 610 may include a control system that manages the loading of the respective open and ducted fans, as well as potentially the exit area of the variable fan nozzle, to provide different thrust, noise, cooling capacity, and other performance characteristics for various portions of the flight envelope and various operational conditions associated with aircraft operation. For example, in a climb mode the ducted fan may operate at a maximum pressure ratio, thereby maximizing the thrust capability of stream, while in a cruise mode, the ducted fan may operate at a lower pressure ratio, raising overall efficiency through reliance on thrust from the unducted fan. Nozzle actuation modulates the ducted fan operating line and overall engine fan pressure ratio independent of total engine airflow.

As previously mentioned, the ducted fan stream flowing through fan duct 639 may include one or more heat exchangers 682 for removing heat from various fluids used in engine operation (such as an air-cooled oil cooler (ACOC), cooled cooling air (CCA), etc.). The heat exchangers 682 may take advantage of the integration into the fan duct 639 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical $CO_2$, EGV, Slither 800, liquid metals, etc.), engine bleed air, etc. Heat exchangers 682 may also be made up of different segments or passages that cool different working fluids, such as an ACOC paired with a fuel cooler. Heat exchangers 682 may be incorporated into a thermal management system which provides for thermal transport via a heat exchange fluid flowing through a network to remove heat from a source and transport it to a heat exchanger.

Since the fan pressure ratio is higher for the ducted fan than for the unducted fan, the fan duct provides an environment where more compact heat exchangers may be utilized than would be possible if installed on the outside of the core cowl in the unducted fan stream. Fan bypass air is at a very low fan pressure ratio (FPR) (1.05 to 1.08), making it difficult to drive air through heat exchangers. Without the availability of a fan duct as described herein, scoops or booster bleed air may be required to provide cooling air to and through heat exchangers. A set of parameters can be developed around heat exchangers in the fan duct, based on heat load, heat exchanger size, ducted fan stream corrected flow, and ducted fan stream temperature.

The fan duct 639 also provides other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the engine core cowl 688 and the exhaust 632. The close-out angle is normally limited by air flow separation, but boundary layer energization by air from the fan duct 639 exhausting over the core cowl reduces air flow separation. This yields a shorter, lighter structure with less frictional surface drag.

The fan assembly and/or vane assembly can be shrouded or unshrouded (as shown in FIGS. 7 and 8). Although not shown, an optional annular shroud or duct can be coupled to the vane assembly 651 and located distally from the engine centerline axis 612 relative to the vanes 652. In addition to the noise reduction benefit, the duct may provide improved vibratory response and structural integrity of the vanes 652 by coupling them into an assembly forming an annular ring or one or more circumferential sectors, i.e., segments forming portions of an annular ring linking two or more of the vanes 652. The duct may also allow the pitch of the vanes to be varied more easily. For example, FIG. 9, discussed in more detail below, discloses embodiments in which both the fan assembly and vane assembly are shrouded.

Although depicted above as an unshrouded or open rotor engine in the embodiments depicted above, it should be appreciated that aspects of the disclosure provided herein may be applied to shrouded or ducted engines, partially ducted engines, aft-fan engines, or other turbomachine configurations, including those for marine, industrial, or aeropropulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine ($D_{core}$) of the engine, $L/D_{core}$ of the engine, desired cruise altitude, and/or desired operating cruise speed, or combinations thereof.

For example, FIG. 9 is a cross-sectional schematic illustration of an exemplary embodiment of an engine 710 that includes a gearbox assembly 746 in combination with a ducted fan assembly 738 and a core engine 716. However, unlike the open rotor configuration of the engine 610, the fan assembly 738 and its fan blades 740 are contained within an annular fan case 750 (which can also be referred to as "a nacelle") and the vane assembly 751 and the vanes 752 extend radially between the fan cowl 786 (and/or the engine core cowl 788) and the inner surface of the fan case 750.

The engine 710 includes a compressor section 723, a combustor section 726, and a turbine section 727. The compressor section 723 can include a high-pressure compressor 724 and a booster or a low-pressure compressor 722. The turbine section 727 can include a high-pressure turbine 728 and a low-pressure turbine 730. The low-pressure compressor 722 is positioned forward of and in flow relationship with the high-pressure compressor 724. The low-pressure compressor 722 is rotatably coupled with the low-pressure turbine 730 via a low-speed shaft 736 to enable the low-pressure turbine 730 to drive the low-pressure compressor 722 (and a ducted fan 780). The low-speed shaft 736 is also operably connected to the gearbox assembly 746 to provide power to the fan assembly 738. The high-pressure compressor 724 is rotatably coupled with the high-pressure turbine 728 via a high-speed shaft 734 to enable the high-pressure turbine 728 to drive the high-pressure compressor 724.

The gearbox assembly 746 includes the epicyclic gear train 200 of FIGS. 2-3. Thus, the gearbox assembly 746 includes the sun gear 202, the plurality of planet gears 204, the ring gear 206, and the carrier 208 arranged in a planetary configuration. Furthermore, the gearbox assembly 746 is characterized by a pin clearance parameter in a range from zero rpm to 3,334 rpm, such as from zero rpm to 3,000 rpm, from 48 rpm to 3,000 rpm, from 48 rpm to 1,334 rpm, and/or from 80 rpm to 1,300 rpm.

In some embodiments, the engine 710 can comprise a pitch change mechanism 747 coupled to the fan assembly 738 and configured to vary the pitch of the fan blades 740. In certain embodiments, the pitch change mechanism 747 can be a linear actuated pitch change mechanism.

In some embodiments, the engine 710 can comprise a variable fan nozzle. Operationally, the engine 710 may include a control system that manages the loading of the fan, as well as potentially the exit area of the variable fan nozzle, to provide different thrust, noise, cooling capacity, and other performance characteristics for various portions of the flight envelope and various operational conditions associated with aircraft operation. For example, nozzle actuation modulates the fan operating line and overall engine fan pressure ratio independent of total engine airflow.

In some embodiments, an engine (e.g., the engine 110, the engine 510, the engine 610, and/or the engine 710) can comprise a counter-rotating low-pressure turbine. For example, FIGS. 10-11 depict schematic cross-sectional illustrations of counter-rotating low-pressure turbines. In particular, FIG. 10 depicts a counter-rotating turbine 800, and FIG. 11 depicts a counter-rotating turbine 900. The counter-rotating turbines comprise inner blade stages and outer blade stages arranged in an alternating inner-outer configuration. In other words, the counter-rotating turbines do not comprise stator vanes disposed between the blade stages.

Referring to FIG. 10, the counter-rotating turbine 800 comprises a plurality of inner blade stages 802 and a plurality of outer blade stages 804. More specifically, the counter-rotating turbine 800 includes three inner blades stages 802 that are coupled to and extend radially outwardly from an inner shaft 806 (which can also be referred to as "a rotor") and three outer blade stages 804 that are coupled to extend radially inwardly from an outer shaft 808 (which can also be referred to as "a drum"). In this manner, the counter-rotating turbine 800 can be considered a six stage turbine.

Referring to FIG. 11, the counter-rotating turbine 900 comprises a plurality of inner blade stages 902 and a plurality of outer blade stages 904. More specifically, the counter-rotating turbine 900 includes four inner blades stages 902 that are coupled to and extend radially outwardly from an inner shaft 906 and three outer blade stages 904 that are coupled to extend radially inwardly from an outer shaft 908. In this manner, the counter-rotating turbine 900 can be considered a seven stage turbine.

During the process of developing the aforementioned embodiments of engines with planetary gearbox assemblies, the inventors found that a steady supply of lubricant is especially important for gearbox assemblies with journal bearings. Unlike gearbox assemblies with roller bearings, gearbox assemblies with journal bearings are are especially sensitive to interruptions in lubricant supply because the steady supply of lubrication is required to prevent the journal bearings from seizing, e.g., due to direct contact between various surfaces of the journal bearings. Thus, the inventors discovered that the inclusion of a lubricant system (e.g., any one of the disclosed lubricant systems disclosed herein) for providing lubricant to the journal bearings is highly beneficial for further reducing the occurrence of journal bearing seizure, thereby increasing the reliability of gearbox assemblies with journal bearings.

The inventors further found that regulating the temperature of the lubricant to be within an operating temperature range of the gearbox assemblies can further improve gearbox performance. For example, ensuring that the temperature of the lubricant entering the gearbox is within the operating temperature range of a given gearbox assembly can help ensure that the lubricant does not overheat the gearbox assembly or various components thereof (e.g., the journal bearings of the gearbox assembly) during operation. In another example, since the viscosity of the lubricant can decrease when the temperature of the lubricant increases, regulating the temperature of the lubricant to be below a certain threshold temperature can help prevent the lubricant from getting too hot and thinning out excessively. Since excessively thinned out lubricant can be less effective at lubricating components, regulating the temperature of the lubricant can beneficially ensure that the disclosed gearbox assemblies remain properly lubricated during operation.

Portions of an exemplary lubricant system 1000 are depicted schematically in FIG. 12, according to one embodiment of the present disclosure. The lubrication system 1000 can be a component of the gas turbine engines disclosed herein and/or can be coupled to the various gearboxes disclosed herein. For example, FIG. 7 schematically illustrates the lubricant system coupled to the turbomachine engine 510 and the gearbox 546. A series of lubricant conduits 1003 can interconnect multiple elements of the lubricant system 1000 and/or engine components, thereby providing for provision or circulation of the lubricant throughout the lubricant system and any engine components coupled thereto, such as one or more journal bearings disposed within the gearbox 546.

It should be understood that the lubricant system 1000 can be used with any gearbox, gear train, and/or bearings disclosed herein. For example, the lubricant system 1000 can be configured to lubricate the journal bearings of the epicyclic gear train 200, and in particular, the bearing pins 302 of the epicyclic gear train 200.

It should be understood that the organization of the lubricant system 1000 as shown is by way of example only to illustrate an exemplary system for a turbomachine engine for circulating lubricant for purposes such as lubrication or heat transfer. Any organization for the lubricant system 1000 is contemplated, with or without the elements as shown, and/or including additional elements interconnected by any necessary conduit system.

Referring again to FIG. 12, the lubricant system 1000 includes a lubricant reservoir 1002 configured to store a coolant or lubricant, including organic or mineral oils, synthetic oils, or fuel, or mixtures or combinations thereof. A supply line 1004 and a scavenge line 1006 are fluidly coupled to the reservoir 1002 and collectively form a lubricant circuit to which the reservoir 1002 and component 1010 can be fluidly coupled. In some examples, the component 1010 can be a gearbox assembly (e.g., any one of gearbox assemblies 146, 546, 646, 746), a gear train (e.g., epicyclic gear train 200) of a gearbox assembly, a gear (e.g., any one of the sun gear 202, the plurality of planet gears 204, the ring gear 206, and the carrier 208) in a gear train, and/or a bearing in a gear train. For example, the component 1010 can be any combination of one of the plurality of planet gears 204 and/or its corresponding bearing pin 302, which includes a journal bearing. The component 1010 can be supplied with lubrication by way of a fluid coupling with the supply line 1004 and can return the supplied lubricant to the reservoir 1002 by fluidly coupling to the scavenge line 1006. More specifically, a component supply line 1011 can be fluidly coupled between the supply line 1004 and the component 1010. It is further contemplated that multiple types of lubricant can be provided in other lines not explicitly shown, but are nonetheless included in the lubricant system 1000.

Optionally, the lubricant system 1000 can include at least one heat exchanger 1005. The heat exchanger 1005 can include any combination of a fuel/lubricant (fuel-to-lubricant) heat exchanger, an oil/lubricant heat exchanger, an air cooled oil cooler, and/or other means for exchanging heat. For example, a fuel/lubricant heat exchanger can be used to heat or cool engine fuel with lubricant passing through the heat exchanger. In another example, a lubricant/oil heat exchanger can be used to heat or cool additional lubricants passing within the turbomachine engine, fluidly separate from the lubricant passing along the lubricant system 1000. Such a lubricant/oil heat exchanger can also include a servo/lubricant heat exchanger. Optionally, a second heat exchanger (not shown) can be provided along the exterior of the core engine, downstream of the outlet guide vane assembly. The second heat exchanger can be an air/lubricant heat exchanger, for example, adapted to convectively cool lubricant in the lubricant system 1000 utilizing the airflow passing through an outlet guide vane assembly of the turbomachine engine.

The lubricant system 1000 can include a pump 1008 to aid in recirculating lubricant from the reservoir 1002 to the component 1010 via the supply line 1004. For example, the pump 1008 can be driven by a rotating component of the gas turbine engine, such as a high-pressure shaft or a low-pressure shaft of a gas turbine engine.

Lubricant can be recovered from the component 1010 by way of the scavenge line 1006 and returned to the reservoir 1002. In the illustrated example, the pump 1008 is located along the supply line 1004 downstream of the reservoir 1002. The pump 1008 can be located in any suitable position within the lubricant system 1000, including along the scavenge line 1006 upstream of the reservoir 1002. In some embodiments, while not shown, the lubricant system 1000 can include multiple pumps, e.g., arranged along the supply line 1004 and/or along the scavenge line 1006.

In some embodiments, a bypass line 1012 can be fluidly coupled to the supply line 1004 and scavenge line 1006 in a manner that bypasses the component 1010. In such embodiments, a bypass valve 1015 is fluidly coupled to the supply line 1004, component supply line 1011, and bypass line 1012. The bypass valve 1015 is configured to control a flow of lubricant through at least one of the component supply line 1011 or the bypass line 1012. The bypass valve 1015 can include any suitable valve including, but not limited to, a differential thermal valve, rotary valve, flow control valve, and/or pressure safety valve. In some embodiments, a plurality of bypass valves can be provided.

During operation, a supply flow 1020 can move from the reservoir 1002, through the supply line 1004, and to the bypass valve 1015. A component input flow 1022 can move from the bypass valve 1015 through the component supply line 1011 to an inlet of the component 1010. In some embodiments in which the component 1010 is a gearbox assembly (e.g., any one of the gearbox assemblies 146, 546, 646, 746 or the gearbox assembly 1050 described later herein with respect to FIG. 13), the flow rate of the component input flow 1022—also referred to herein as the "component input flow rate"—can be in a range from 5 gallons per minute (gpm) to 55 gpm, as measured at a max takeoff condition. For example, the component input flow rate can be from 3 gpm to 9 gpm, from 4 gpm to 13 gpm, from 5 gpm to 9 gpm, from 5 gpm to 40 gpm, from 5 gpm to 25 gpm, from 5.25 gpm to 25 gpm, 6 gpm to 36 gpm, from 7 gpm to 13 gpm, from 8 gpm to 13 gpm, from 8 gpm to 25 gpm, and/or from 16 gpm to 24 gpm. In some embodiments, a lubricant supply requirement of the component 1010 (e.g., any one of the gearbox assemblies 146, 546, 646, 746, 1050) can fall within one or more of the ranges. Thus, configuring the component input flow rate to be within one or more of the disclosed ranges can beneficially ensure that the component 1010 remains properly lubricated during operation, thereby improving the performance and reliability of the component 1010 and/or the overall performance and reliability of the gas turbine engine.

A scavenge flow 1024 can move lubricant from an outlet of the component 1010 through the scavenge line 1006 and back to the reservoir 1002. Optionally, a bypass flow 1026 can move from the bypass valve 1015 through the bypass line 1012 and to the scavenge line 1006. The bypass flow 1026 can mix with the scavenge flow 1024 and define a return flow 1028 moving toward the lubricant reservoir 1002.

In some embodiments where no bypass flow exists, it is contemplated that the supply flow 1020 can be the same as the component input flow 1022 and that the scavenge flow 1024 can be the same as the return flow 1028. In some embodiments where the bypass flow 1026 has a nonzero flow rate, the supply flow 1020 can be divided at the bypass valve 1015 into the component input flow 1022 and bypass flow 1026. It will also be understood that additional components (for example, additional gearboxes, gear trains, gears, and/or bearings), valves, sensors, or conduit lines can be provided in the lubricant system 1000, and that the example shown in FIG. 12 is simplified with a single component 1010 for purposes of illustration.

The lubricant system 1000 can further include at least one sensing position at which at least one lubricant parameter can be sensed or detected. The at least one lubricant parameter can include, but is not limited to, a flow rate, a temperature, a pressure, a viscosity, a chemical composition of the lubricant, or the like. In the illustrated example, a first sensing position 1016 is located in the supply line 1004 upstream of the component 1010, and a second sensing position 1018 is located in the scavenge line 1006 downstream of the component 1010.

In some embodiments, the bypass valve 1015 can be a differential thermal valve configured to sense or detect at least one lubricant parameter in the form of a temperature of the lubricant. In such an embodiment, the fluid coupling of the bypass valve 1015 to the first and second sensing positions 1016, 1018 can provide for bypass valve 1015 sensing or detecting the lubricant temperature at the sensing positions 1016, 1018 as lubricant flows to or from the bypass valve 1015. The bypass valve 1015 can be configured to control the component input flow 1022 or the bypass flow 1026 based on the sensed or detected temperature.

In some embodiments, the bypass valve 1015, supply line 1004, and bypass line 1012 can at least partially define a closed loop control system for the component 1010. As used herein, a "closed loop control system" refers to a system having mechanical or electronic components that can automatically regulate, adjust, modify, or control a system variable without manual input or other human interaction. Such closed loop control systems can include sensing components to sense or detect parameters related to the desired variable to be controlled, and the sensed or detected parameters can be utilized as feedback in a "closed loop" manner to change the system variable and alter the sensed or detected parameters back toward a target state. In the example of the lubricant system 1000, the bypass valve 1015 (e.g., a mechanical or electrical component) can sense a parameter, such as the lubricant parameter (e.g., temperature), and automatically adjust a system variable, e.g., flow rate, to either or both of the bypass line 1012 or component 1010, without additional or manual input. In some embodiments, the bypass valve 1015 can be automatically adjustable or self-adjustable such as a thermal differential bypass valve. In some embodiments, the bypass valve 1015 can be operated or actuated via a separate controller. It should be understood that a closed loop control system as described herein can incorporate such a self-adjustable bypass valve or a controllable bypass valve.

Turning to FIG. 13, a portion of the lubricant system 1000 is illustrated supplying lubricant to a particular component 1010 in the form of a gearbox assembly 1050 within a gas turbine engine. The gearbox assembly 1050 can be or be similar to any of the gearboxes disclosed herein (for example, any one of gearboxes 146, 546, 646, 746). For example, the gearbox assembly 1050 can include the epicyclic gear train 200 of FIGS. 2-3. Thus, in this example, the gearbox assembly 1050 includes the sun gear 202, the plurality of planet gears 204, the ring gear 206, and the carrier 208 arranged in a planetary configuration. Furthermore, in this example, the gearbox assembly 1050 is characterized by a pin clearance parameter in a range from zero rpm to 3,334 rpm, such as from zero rpm to 3,000 rpm, from 48 rpm to 3,000 rpm, from 48 rpm to 1,334 rpm, and/or from 80 rpm to 1,300 rpm.

As shown, the gearbox assembly 1050 includes an input shaft 1052, an output shaft 1054, and a gear train 1055. The gear train 1055 can be similar to the epicyclic gear train 200 in that the gear train 1055 can be an epicyclic gear train arranged in a planetary configuration. An outer housing 1056 can at least partially surround the gear train 1055 and form a structural support for the gears and bearings (e.g., journal bearings) therein. Either or both of the input and output shafts 1052, 1054 can be coupled to the gas turbine engine. In one example, the input and output shafts 1052, 1054 can be utilized to decouple the speed of the low-pressure turbine from the low-pressure compressor and/or the fan, which can, for example, improve engine efficiency.

The supply line 1004 can be fluidly coupled to the gearbox assembly 1050, such as to the gear train 1055, to supply lubricant to gears or bearings to the gearbox assembly 1050 during operation. The scavenge line 1006 can be fluidly coupled to the gearbox assembly 1550, such as to the gear train 1055 or outer housing 1056, to collect lubricant. The bypass line 1012 can be fluidly coupled to the bypass valve 1015, supply line 1004, and scavenge line 1006 as shown. A return line 1014 can also be fluidly coupled to the bypass valve 1015, such as for directing the return flow 1028 to the lubricant reservoir 1002 for recirculation. While not shown in FIG. 13 for brevity, the lubricant reservoir 1002, the heat exchanger 1005, and/or the pump 1008 can also be fluidly coupled to the gearbox assembly 1050. In this manner, the supply line 1004, bypass line 1012, scavenge line 1006, and return line 1014 can at least partially define a recirculation line 1030 for the lubricant system 1000.

The supply flow 1020 divides at the bypass line into the component input flow 1022 and the bypass flow 1026. In some embodiments, the bypass valve 1015 can be a differential thermal valve that is fluidly coupled to the first and second sensing positions 1016, 1018.

Lubricant flowing proximate the first and second sensing positions 1016, 1018 provides the respective first and second outputs 1041, 1042 indicative of the temperature of the lubricant at those sensing positions 1016, 1018. The supply line 1004 is thermally coupled to the bypass line 1012 and bypass valve 1015 such that the temperature of the fluid in the supply line 1004 proximate the first sensing position 1016 is approximately the same as fluid in the bypass line 1012 adjacent the bypass valve 1015. Two values being "approximately the same" as used herein will refer to the two values not differing by more than a predetermined amount, such as by more than 20%, or by more than 5 degrees, in some examples. In this manner, the bypass valve 1015 can sense the lubricant temperature in the supply line 1004 and scavenge line 1006 via the first and second outputs 1041, 1042. It can be appreciated that the bypass line 1012 can form a sensing line for the valve 1015 to sense the lubricant parameter, such as temperature, at the first sensing position 1016.

During operation of the gas turbine engine, the lubricant temperature can increase within the gearbox assembly 1050, such as due to heat generation of the gearbox assembly 1050, and throughout the lubricant system 1500. In one example, if a lubricant temperature exceeds a predetermined threshold temperature at either sensing position 1016, 1018, the bypass valve 1015 can automatically increase the component input flow 1022, e.g., from the supply line 1004 to the gearbox assembly 1050, by decreasing the bypass flow 1026. Such a predetermined threshold temperature can be any suitable operating temperature for the gearbox assembly 1050, for example, about 300° F. Increasing the component input flow 1022 can provide for cooling of the gearbox assembly 1050, thereby reducing the lubricant temperature sensed in the various lines 1004, 1006, 1012, 1014 as lubricant recirculates through the lubricant system 1000.

In some embodiments, if a temperature difference between the sensing positions 1016, 1018 exceeds a predetermined threshold temperature difference, the bypass valve can automatically increase the component input flow 1022 by decreasing the bypass flow 1026. Such a predetermined threshold temperature difference can be any suitable operating temperature for the gearbox assembly 1050, such as about 70° F., or differing by more than 30%, in some examples. In some embodiments, if a temperature difference between the sensing positions 1016, 1018 is below the predetermined threshold temperature difference, the bypass valve can automatically decrease the component input flow 1022 or increase the bypass flow 1026. In this manner, the lubricant system 1000 can provide for the gearbox assembly 1050 to operate with a constant temperature difference between the supply and scavenge lines 1004, 1006.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises: a bearing pin comprising a pin outer surface; an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear; a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$ PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right] $$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch, and wherein the pin clearance parameter is greater than or equal to zero rpm and less than or equal to 3,334 rpm.

The gas turbine engine of any clause herein, wherein the sun gear further comprises a plurality of sun gear teeth, the ring gear further comprises a plurality of ring gear teeth, and the gear ratio of the epicyclic gear train is a sum of the number of the plurality of ring gear teeth and the number of the plurality of sun gear teeth divided by the number of the plurality of sun gear teeth.

The gas turbine engine of any clause herein, wherein the pin clearance parameter includes values in a range from zero rpm to 3,000 rpm.

The gas turbine engine of any clause herein, wherein the pin clearance parameter includes values in a range from 48 rpm to 1,334 rpm.

The gas turbine engine of any clause herein, wherein the pin clearance parameter includes values in a range from 80 rpm to 1,300 rpm.

The gas turbine engine of any clause herein, wherein the gas turbine engine is configured to produce the fan power in a range from 7,000 horsepower to 80,000 horsepower at takeoff conditions.

The gas turbine engine of any clause herein, wherein the gas turbine engine is configured to produce the fan speed in a range from 1,600 rpm to 3,334 rpm at takeoff conditions.

The gas turbine engine of any clause herein, wherein the number of the plurality of planet gears is three, four, five, or six.

The gas turbine engine of any clause herein, wherein the gas turbine engine has a bypass ratio in a range from 12 to 15.

The gas turbine engine of any clause herein, wherein the gas turbine engine further comprises a HP compressor disposed aft of the epicyclic gear train, wherein the HP compressor comprises eight, nine, or ten HP compressor stages.

The gas turbine engine of any clause herein, wherein the gas turbine engine further comprises a LP turbine coupled to the LP shaft and comprising a plurality of LP turbine stages, wherein the number of the plurality of LP turbine stages is three, four, five, or six.

The gas turbine engine of any clause herein, wherein the gas turbine engine further comprises: a fan shaft coupled to the carrier of the epicyclic gear train; and a fan coupled to the fan shaft, wherein the fan comprises a fan diameter that ranges from 80 inches to 95 inches.

The gas turbine engine of any clause herein, wherein the fan diameter ranges from 85 inches to 90 inches.

The gas turbine engine of any clause herein, wherein each of the plurality of planet gears further comprises a bearing, and wherein the annular planet gear rim is disposed circumferentially around the bearing.

The gas turbine engine of any clause herein, wherein the bearing comprises a journal bearing.

A gas turbine engine can include a gearbox assembly mechanically coupled to an LP shaft of the gas turbine engine, wherein the gearbox assembly can include a sun gear, a ring gear, a carrier, and a plurality of planet gears arranged in a planetary configuration. Each of the plurality of planet gears can include a bearing pin with a pin outer surface; an annular planet gear rim with an inner surface, planet gear bending stress neutral axis radius, and a pin clearance parameter. The inner surface of the planet gear rim and the pin outer surface can define a clearance greater than zero when a radial component force, a pinch component force, a tangential component force, and a centrifugal component force are applied to the planet gear. The planet gear bending stress neutral axis radius is a radius where stresses and strains within the annular planet gear rim are zero when the radial component force, the pinch component force, the tangential component force, and the centrifugal component force are applied to the planet gear. The pin clearance parameter is defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "cr" is the clearance in inches, "GR" is a gear ratio of the gearbox assembly, "rp" is the planet gear bending stress neutral axis radius in inches, "Np" is a number of the plurality of planet gears, "HPfan" is a fan power of the gas turbine engine in horsepower at takeoff conditions, "Ωfan" is a fan speed of the gas turbine engine in rpm at takeoff conditions, K1 is a first constant of 1.96×10-5 per horsepower-minute-inch, and K2 is a second constant of 4.91×10-9 horsepower-minutes cubed per cubic inch, and wherein the pin clearance parameter can be greater than or equal to zero rpm and less than or equal to 3,334 rpm. The gas turbine engine can also include a lubricant system configured to supply a lubricant to the gearbox assembly.

The gas turbine engine of any clause herein, wherein the sun gear can include a plurality of sun gear teeth, the ring gear further can include a plurality of ring gear teeth, the gear ratio of the gearbox assembly can be a sum of the number of the plurality of ring gear teeth and the number of the plurality of sun gear teeth divided by the number of the plurality of sun gear teeth, and the gear ratio can be in a range from 2.5 to 5.

The gas turbine engine of any clause herein, wherein the pin clearance parameter can include values in a range from zero rpm to 3,000 rpm, wherein the lubricant system can further include a bypass valve fluidly coupled to the supply line, the component supply line, and the bypass line, and wherein the bypass valve can be configured to control a flow of lubricant through at least one of the component supply line or the bypass line.

The gas turbine engine of any clause herein, wherein the pin clearance parameter can include values in a range from 48 rpm to 1,334 rpm, wherein the lubricant system can further include a bypass valve fluidly coupled to the supply line, the component supply line, and the bypass line, and wherein the bypass valve can be configured to control a flow of lubricant through at least one of the component supply line or the bypass line.

The gas turbine engine of any clause herein, wherein the pin clearance parameter can include values in a range from 80 rpm to 1,300 rpm, wherein the lubricant system can further include a bypass valve fluidly coupled to the supply line, the component supply line, and the bypass line, and wherein the bypass valve can be configured to control a flow of lubricant through at least one of the component supply line or the bypass line.

The gas turbine engine of any clause herein, wherein the gas turbine engine can be configured to produce the fan power in a range from 7,000 horsepower to 80,000 horsepower at takeoff conditions.

The gas turbine engine of any clause herein, wherein the gas turbine engine can be configured to produce the fan speed in a range from 1,600 rpm to 3,334 rpm at takeoff conditions.

The gas turbine engine of any clause herein, wherein the gas turbine engine can include a HP compressor disposed aft of the gearbox assembly, wherein the HP compressor can include eight, nine, or ten HP compressor stages.

The gas turbine engine of any clause herein, wherein the gas turbine engine can include a LP turbine coupled to the LP shaft and includes a plurality of LP turbine stages, wherein the number of the plurality of LP turbine stages can be three, four, five, or six.

The gas turbine engine of any clause herein, wherein the gas turbine engine can include: a fan shaft coupled to the carrier of the gearbox assembly; and a fan coupled to the fan shaft, wherein the fan can include a fan diameter within a range from 80 inches to 95 inches.

The gas turbine engine of any clause herein, wherein the fan diameter can be within a range from 85 inches to 90 inches.

The gas turbine engine of any clause herein, wherein each of the plurality of planet gears further includes a journal bearing around which the annular planet gear rim is disposed.

A gas turbine engine can include a gearbox assembly mechanically coupled to an LP shaft of the gas turbine engine, wherein the gearbox assembly can include a sun gear, a ring gear, a carrier, and a plurality of planet gears arranged in a planetary configuration. Each of the plurality of planet gears can include a bearing pin with a pin outer surface; an annular planet gear rim with an inner surface, planet gear bending stress neutral axis radius, and a pin clearance parameter. The inner surface of the planet gear rim and the pin outer surface can define a clearance greater than zero when a radial component force, a pinch component force, a tangential component force, and a centrifugal component force are applied to the planet gear. The planet gear bending stress neutral axis radius is a radius where stresses and strains within the annular planet gear rim are zero when the radial component force, the pinch component force, the tangential component force, and the centrifugal component force are applied to the planet gear. The pin clearance parameter is defined by:

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein "PCP" is the pin clearance parameter in rpm, "cr" is the clearance in inches, "GR" is a gear ratio of the gearbox assembly, "rp" is the planet gear bending stress neutral axis radius in inches, "Np" is a number of the plurality of planet gears, "HPfan" is a fan power of the gas turbine engine in horsepower at takeoff conditions, "Ωfan" is a fan speed of the gas turbine engine in rpm at takeoff conditions, K1 is a first constant of 1.96×10-5 per horsepower-minute-inch, and K2 is a second constant of 4.91×10-9 horsepower-minutes cubed per cubic inch, and wherein the pin clearance parameter can be greater than or equal to zero rpm and less than or equal to 3,334 rpm. The gas turbine engine can also include a lubricant system configured to supply a lubricant to the gearbox assembly. The lubricant system can include a reservoir; a supply line fluidly coupled to the reservoir; a bypass valve fluidly coupled to the supply line; a component supply line fluidly coupled to the bypass valve and fluidly coupled to the gearbox assembly; a scavenge line fluidly coupled to the gearbox assembly and fluidly coupled to the reservoir; and a bypass line fluidly coupled to the bypass valve and fluidly coupled to the scavenge line.

The gas turbine engine of any clause herein, wherein the lubricant system can be configured to supply lubricant to the gearbox assembly at a rate in a range from 5 gallons per minute to 55 gallons per minute, as measured at a max takeoff condition, and wherein the gas turbine engine can include a fan having a fan diameter ranging from 80 inches to 95 inches.

The gas turbine engine of any clause herein, wherein the lubricant system can be configured to supply lubricant to the gearbox assembly at a rate in a range from 5.25 gallons per minute to 25 gallons per minute, and wherein the fan diameter can range from 85 inches to 95 inches.

The gas turbine engine of any clause herein, wherein the lubricant system can include: a first sensing component configured to measure a lubricant parameter at a first sensing position upstream of the gearbox assembly; and a second sensing component configured to measure a lubricant parameter at a second sensing position downstream of the gearbox assembly.

The gas turbine engine of any clause herein, wherein the lubricant parameter can be a temperature of the lubricant, and wherein the gearbox assembly can have a gear ratio in a range from 2.5 to 5.

The gas turbine engine of any clause herein, wherein the lubricant system can be configured to determine a difference of the lubricant parameter measured at the first sensing position and the lubricant parameter measured at the second sensing position.

The gas turbine engine of any clause herein, wherein the lubricant system can be configured to increase a flow rate of the lubricant through the component supply line if the difference of the lubricant parameter measured at the first sensing position and the lubricant parameter measured at the second sensing position exceeds a predetermined threshold lubricant parameter difference.

The gas turbine engine of any clause herein, wherein the lubricant system can include a heat exchanger fluidly coupled to the scavenge line.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

The invention claimed is:
1. A gas turbine engine comprising:
a gearbox assembly mechanically coupled to an LP shaft of the gas turbine engine, wherein the gearbox assembly comprises a sun gear, a ring gear, a carrier, and a plurality of planet gears arranged in a planetary configuration, wherein each of the plurality of planet gears comprises:
a bearing pin comprising a pin outer surface;
an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear;
a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and
a pin clearance parameter defined by:

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the gearbox assembly, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of 1.96×10$^{-5}$ per horsepower-minute-inch, and $K_2$ is a second constant of 4.91×10$^{-9}$ horsepower-minutes cubed per cubic inch, and wherein the pin clearance parameter is greater than or equal to zero rpm and less than or equal to 3,334 rpm; and
a lubricant system configured to supply a lubricant to the gearbox assembly, the lubricant system comprising:
a supply line;
a first sensing component configured to measure a lubricant temperature at a first sensing position upstream of the gearbox assembly; and
a second sensing component configured to measure a lubricant temperature at a second sensing position downstream of the gearbox assembly;

wherein the lubricant system is configured to determine a difference of the lubricant temperature measured at the first sensing position and the lubricant temperature measured at the second sensing position, and wherein the lubricant system is configured to increase a flow rate of the lubricant through a component supply line if the difference of the lubricant temperature measured at the first sensing position and the lubricant temperature measured at the second sensing position exceeds a predetermined threshold lubricant temperature difference.

2. The gas turbine engine of claim 1, wherein:

the sun gear further comprises a plurality of sun gear teeth, the ring gear further comprises a plurality of ring gear teeth, the gear ratio of the gearbox assembly is a sum of the number of the plurality of ring gear teeth and the number of the plurality of sun gear teeth divided by the number of the plurality of sun gear teeth, and wherein the gear ratio is in a range from 2.5 to 5.

3. The gas turbine engine of claim 1, wherein the pin clearance parameter includes values in a range from zero rpm to 3,000 rpm, wherein the lubricant system further comprises a bypass valve fluidly coupled to the supply line, the component supply line, and a bypass line, and wherein the bypass valve is configured to control a flow of lubricant through at least one of the component supply line or the bypass line.

4. The gas turbine engine of claim 1, wherein the pin clearance parameter includes values in a range from 48 rpm to 1,334 rpm, wherein the lubricant system further comprises a bypass valve fluidly coupled to the supply line, the component supply line, and a bypass line, and wherein the bypass valve is configured to control a flow of lubricant through at least one of the component supply line or the bypass line.

5. The gas turbine engine of claim 1, wherein the pin clearance parameter includes values in a range from 80 rpm to 1,300 rpm, wherein the lubricant system further comprises a bypass valve fluidly coupled to the supply line, the component supply line, and a bypass line, and wherein the bypass valve is configured to control a flow of lubricant through at least one of the component supply line or the bypass line.

6. The gas turbine engine of claim 1, wherein the gas turbine engine is configured to produce the fan power in a range from 7,000 horsepower to 80,000 horsepower at takeoff conditions.

7. The gas turbine engine of claim 1, wherein the gas turbine engine is configured to produce the fan speed in a range from 1,600 rpm to 3,334 rpm at takeoff conditions.

8. The gas turbine engine of claim 1, wherein the gas turbine engine further comprises an HP compressor disposed aft of the gearbox assembly, wherein the HP compressor comprises eight, nine, or ten HP compressor stages.

9. The gas turbine engine of claim 1, wherein the gas turbine engine further comprises an LP turbine coupled to the LP shaft and comprising a plurality of LP turbine stages, wherein the number of the plurality of LP turbine stages is three, four, five, or six.

10. The gas turbine engine of claim 1, wherein the gas turbine engine further comprises:

a fan shaft coupled to the carrier of the gearbox assembly; and a fan coupled to the fan shaft, wherein the fan comprises a fan diameter within a range from 80 inches to 95 inches.

11. The gas turbine engine of claim 10, wherein the fan diameter is within a range from 85 inches to 90 inches.

12. The gas turbine engine of claim 1, wherein each of the plurality of planet gears further comprises a journal bearing around which the annular planet gear rim is disposed.

13. A gas turbine engine comprising:

a gearbox assembly mechanically coupled to an LP shaft of the gas turbine engine, wherein the gearbox assembly comprises a sun gear, a ring gear, a carrier, and a plurality of planet gears arranged in a planetary configuration, wherein each of the plurality of planet gears comprises:

a bearing pin comprising a pin outer surface;

an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear;

a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r}\frac{GR}{GR-2}r_p^2\left[K_2 r_p^3\Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the gearbox assembly, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of 4.91×10-9 horsepower-minutes cubed per cubic inch, and wherein the pin clearance parameter is greater than or equal to zero rpm and less than or equal to 3,334 rpm; and a lubricant system configured to supply a lubricant to the gearbox assembly, the lubricant system comprising:

a reservoir;

a supply line fluidly coupled to the reservoir;

a bypass valve fluidly coupled to the supply line;

a component supply line fluidly coupled to the bypass valve and fluidly coupled to the gearbox assembly;

a scavenge line fluidly coupled to the gearbox assembly and fluidly coupled to the reservoir; and a bypass line fluidly coupled to the bypass valve and fluidly coupled to the scavenge line.

14. The gas turbine engine of claim 13, wherein the lubricant system is configured to supply lubricant to the gearbox assembly at a rate in a range from 5 gallons per minute to 55 gallons per minute, as measured at a max takeoff condition, and wherein the gas turbine engine comprises a fan having a fan diameter ranging from 80 inches to 95 inches.

15. The gas turbine engine of claim 14, wherein the lubricant system is configured to supply lubricant to the gearbox assembly at a rate in a range from 5.25 gallons per minute to 25 gallons per minute, and wherein the fan diameter ranges from 85 inches to 95 inches.

16. The gas turbine engine of claim 13, wherein the lubricant system further comprises:

a first sensing component configured to measure a lubricant temperature at a first sensing position upstream of the gearbox assembly; and a second sensing component configured to measure a lubricant temperature at a second sensing position downstream of the gearbox assembly.

17. The gas turbine engine of claim 16, wherein the gearbox assembly has a gear ratio in a range from 2.5 to 5.

18. The gas turbine engine of claim 16, wherein the lubricant system is configured to determine a difference of the lubricant temperature measured at the first sensing position and the lubricant temperature measured at the second sensing position.

19. The gas turbine engine of claim 18, wherein the lubricant system is configured to increase a flow rate of the lubricant through the component supply line if the difference of the lubricant temperature measured at the first sensing position and the lubricant temperature measured at the second sensing position exceeds a predetermined threshold lubricant temperature difference.

20. The gas turbine engine of claim 13, wherein the lubricant system further comprises a heat exchanger fluidly coupled to the scavenge line.

* * * * *